(12) United States Patent
Dortch et al.

(10) Patent No.: US 12,368,963 B1
(45) Date of Patent: Jul. 22, 2025

(54) SYSTEM AND METHOD FOR AUTOMATICALLY ADJUSTING LIGHTING FOR A VIDEO FEED

(71) Applicant: UIPCO, LLC, San Antonio, TX (US)

(72) Inventors: Celena Dortch, San Antonio, TX (US); Sacha Melquiades De'Angeli, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 4 days.

(21) Appl. No.: 17/936,403

(22) Filed: Sep. 29, 2022

Related U.S. Application Data

(60) Provisional application No. 63/250,271, filed on Sep. 30, 2021.

(51) Int. Cl.
| | |
|---|---|
| *H04N 23/72* | (2023.01) |
| *G06V 20/40* | (2022.01) |
| *G06V 40/16* | (2022.01) |
| *H04N 23/56* | (2023.01) |

(52) U.S. Cl.
CPC ............ *H04N 23/72* (2023.01); *G06V 20/41* (2022.01); *G06V 40/161* (2022.01); *H04N 23/56* (2023.01)

(58) Field of Classification Search
None
See application file for complete search history.

(56) References Cited

U.S. PATENT DOCUMENTS

| | | | | |
|---|---|---|---|---|
| 7,705,874 | B2 * | 4/2010 | Du Breuil | H04N 7/147 348/14.01 |
| 8,553,103 | B1 * | 10/2013 | Samadani | G06V 10/145 348/364 |
| 9,131,150 | B1 | 9/2015 | Mangiat et al. | |
| 9,436,870 | B1 | 9/2016 | Mangiat et al. | |
| 9,609,230 | B1 * | 3/2017 | Bakshi | H04N 23/56 |
| 9,635,255 | B1 * | 4/2017 | Baldwin | H04N 23/74 |
| 10,277,829 | B1 * | 4/2019 | Garrido | H04N 23/63 |
| 2006/0204057 | A1 | 9/2006 | Steinberg | |
| 2007/0081094 | A1 * | 4/2007 | Ciudad | H04N 7/141 348/E5.038 |
| 2008/0316325 | A1 | 12/2008 | Nakahara | |

(Continued)

FOREIGN PATENT DOCUMENTS

WO  WO-2011058675 A1 *  5/2011  ............ G03B 17/20

OTHER PUBLICATIONS

Final Office Action mailed Feb. 20, 2025 in U.S. Appl. No. 17/936,411.
Office Action mailed Jan. 2, 2024 for U.S. Appl. No. 17/936,413.

*Primary Examiner* — Anthony J Daniels
(74) *Attorney, Agent, or Firm* — Plumsea Law Group, LLC

(57) ABSTRACT

A system and method for automatically adjusting lighting settings to optimize the image quality of a video feed is disclosed. The method includes receiving a video feed from a camera, detecting a face within the video feed, and defining a facial region bounding the detected face. The method also includes analyzing the facial region and determining an image characteristic corresponding to the facial region. The method can also include sending commands to a lighting device to automatically adjust one or more lighting settings based on the value of the image characteristic. Such a system may be used in a variety of applications, including video calls.

20 Claims, 23 Drawing Sheets

(56) References Cited

U.S. PATENT DOCUMENTS

| | | |
|---|---|---|
| 2009/0196509 A1 | 8/2009 | Farrer et al. |
| 2012/0270600 A1 | 10/2012 | Zelson |
| 2012/0274724 A1* | 11/2012 | Cross .................... H04N 23/88 |
| | | 348/14.1 |
| 2014/0049595 A1 | 2/2014 | Feng et al. |
| 2015/0002735 A1* | 1/2015 | Moskovchenko ..... H04N 23/56 |
| | | 348/370 |
| 2015/0049211 A1 | 2/2015 | Lim |
| 2016/0156838 A1 | 6/2016 | Cheng et al. |
| 2016/0248975 A1 | 8/2016 | Choi et al. |
| 2019/0206031 A1 | 7/2019 | Kim et al. |
| 2019/0370532 A1 | 12/2019 | Soni et al. |
| 2020/0092453 A1 | 3/2020 | Gordon et al. |
| 2020/0382689 A1* | 12/2020 | Oh ........................ H04N 23/95 |
| 2022/0028115 A1 | 1/2022 | Sabripour et al. |
| 2022/0262326 A1* | 8/2022 | Sommerlade .......... G06V 10/82 |
| 2022/0329727 A1 | 10/2022 | Bryan et al. |
| 2023/0239559 A1* | 7/2023 | DeRoos ................ H04N 23/74 |
| | | 348/222.1 |

* cited by examiner

SYSTEM AND METHOD FOR AUTOMATICALLY ADJUSTING LIGHTING FOR A VIDEO FEED

CROSS-REFERENCE TO RELATED APPLICATIONS

This application claims the benefit of Provisional Patent Application No. 63/250,271 filed Sep. 30, 2021, and titled "System and Method for Automatically Adjusting Lighting for a Video Feed," which is incorporated by reference herein in its entirety.

TECHNICAL FIELD

The present disclosure generally relates to video, and in particular to optimizing lighting qualities of a video.

BACKGROUND

Consumers are coming to rely on using cameras (and specifically, so-called "webcams"), to stream video during video calls for both remote work and personal social interactions. Most inexpensive cameras, including webcams, which may be used for remote work and other video calls aren't well calibrated to produce the best exposure for some user complexions. This can result in video feeds that are overexposed, or underexposed, especially with respect to the caller's face. In the context of remote work, or video conferencing, this can lead to differences in the image quality of video feeds for users with different complexions. This can cause frustration for user's whose video feeds are not properly exposed. In the context of remote work, such discrepancies in image quality can have a negative impact on a particular employee's ability to communicate while on video calls.

There is a need in the art for a system and method that addresses the shortcomings discussed above.

SUMMARY

In one aspect, a method of optimizing image quality for real-time video feeds by automatically controlling a lighting device connected to a computer system includes steps of receiving a video feed from a camera at the computer system, automatically detecting a face within the video feed, defining a facial region of the video feed including the face, and analyzing the facial region to determine an image characteristic. The method also includes steps of establishing communication with a lighting device controller, the lighting device controller controlling the lighting device, the lighting device controller initially having a lighting setting with a first value, and sending a command to the lighting device controller, based on the determined value for the image characteristic, to adjust the lighting setting to a second value that is different from the first value.

In another aspect, a method of improving the appearance of faces within real-time video feeds by automatically controlling a region of a digital display screen of a computer system includes steps of receiving a video feed from a camera at the computer system, automatically detecting a face within the video feed, defining a facial region of the video feed including the face, and establishing communication with a display controller, the display controller controlling the digital display screen of the computer system. The method also includes steps of creating, via communication the display controller, an illumination region on the digital display screen, and automatically adjusting, by sending commands to the display controller, a lighting setting associated with the illumination region to optimize an image characteristic of the facial region of the video feed.

In another aspect, a system for optimizing image quality for real-time video feeds by adjusting a lighting setting of a lighting device includes a computer system configured to receive a video feed from a camera. The computer system further includes a processor, memory comprising a non-transitory computer readable medium, the memory storing instructions that may be executed by the processor, and an image optimization application stored in the memory. The system also includes a lighting device controller providing an interface between the image optimization application and the lighting device, the lighting device controller being configured to adjust the lighting setting of the lighting device. The image optimization application is configured to detect a face within a video feed received from the camera, and wherein the image optimization application is configured to define a facial region surrounding the detected face within the video feed. The image optimization application is configured to analyze the facial region and determine an image characteristic corresponding to the facial region. The image optimization application is configured to communicate with the lighting device controller and adjust, via commands sent to the lighting device controller, the lighting setting based on at least the determined image characteristic.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
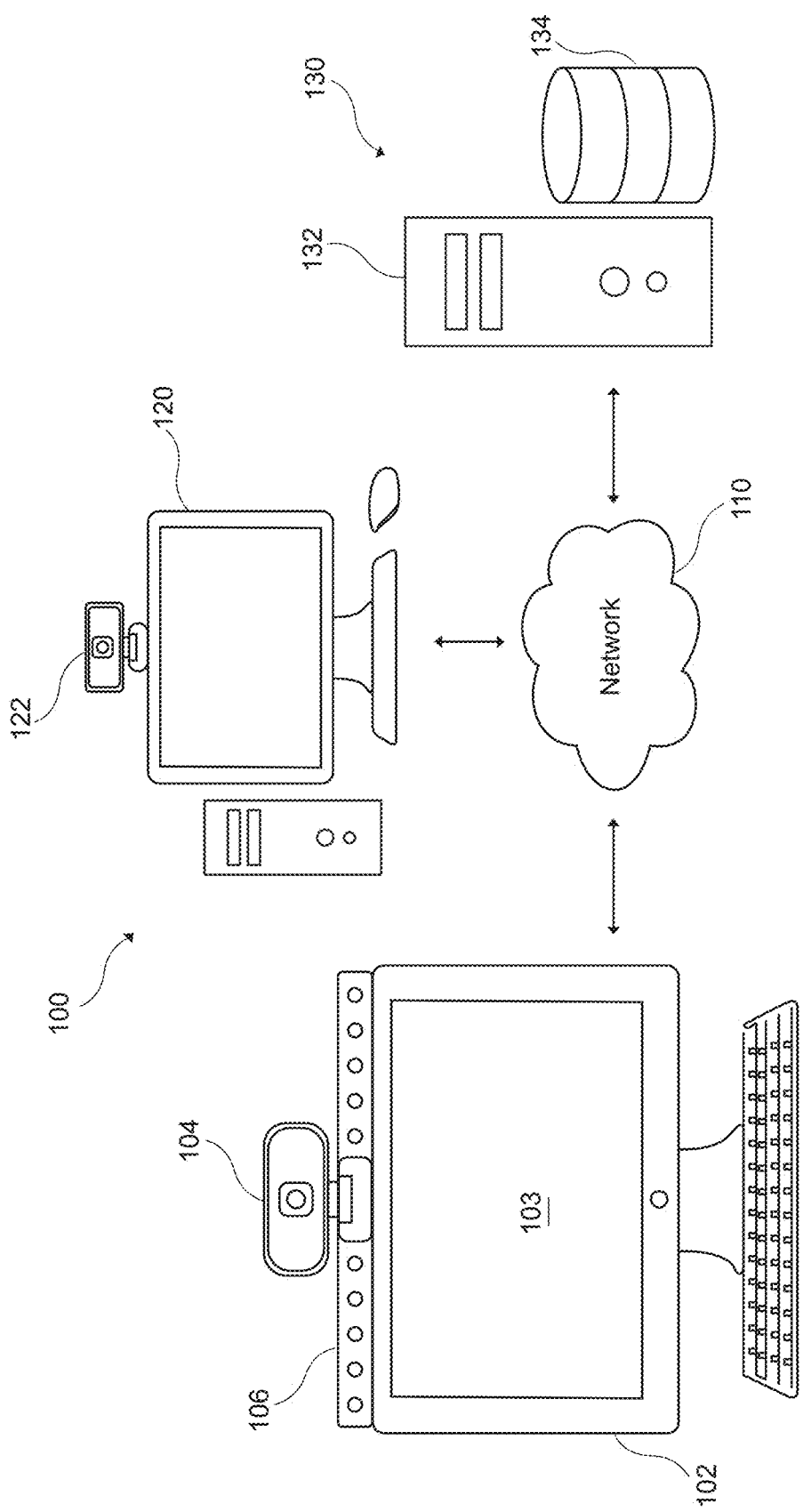
FIG. 1 is a schematic view of an arrangement of networked computer systems, according to an embodiment.

The embodiments provide systems and methods for improving the image quality of inexpensive video devices (such as webcams) by using computer vision to detect faces and by automatically adjusting camera settings and/or lighting settings in real-time.

The embodiments provide systems and methods for detecting a user's face within a video feed, analyzing the image quality of the user's face within the video feed, and automatically adjusting camera settings of the camera capturing the video feed to optimize the quality of the video. In some cases, the exposure of the user's face is optimized.

Other embodiments provide systems and methods for detecting a user's face within a video feed, analyzing the image quality of the user's face within the video feed, and automatically adjusting lighting settings of either an external lighting device, or lighting generated by a display screen, to optimize the quality of the video. In some cases, the exposure of the user's face is optimized.

Still other embodiments provide systems and methods for detecting a user's face within a video feed, analyzing the image quality of the user's face within the video feed, and automatically adjusting camera settings and lighting settings simultaneously, to optimize the quality of the video. In some cases, the exposure of the user's face is optimized.

Still other embodiments provide systems and methods for detecting and recognizing a user's face, and providing a user interface that allows the user to select user-preferred settings for a camera or a lighting device (or display screen). In some cases, the systems and methods also allow a user to select user-preferred image processing settings. The system can then retrieve the user-preferred settings whenever the user's face is detected within a video feed.

The embodiments describe digital cameras that may have one or more camera settings. Exemplary camera settings include, but are not limited to: shutter-speed, aperture, and ISO. The shutter-speed characterizes how quickly the camera shutter opens and closes, and thus the duration of time over which light can pass to the camera sensor. The aperture characterizes the size of the opening that the light passes through (when the shutter is open). The ISO setting of a digital camera controls how sensitive the camera's sensor is to light.

As used herein, the term "exposure" refers to the amount of light reaching a (digital) camera's sensor. Exposure varies according to (at least) the camera settings for aperture, shutter-speed, and ISO. One metric for evaluating the exposure for a given set of camera settings is known as the "Exposure Value," or simply "EV". The EV is a single number and can be calculated as a function of the aperture, shutter-speed, and ISO values. Moreover, there may be different sets of values (that is, values of shutter-speed, aperture, and ISO) that evaluate to the same exposure value. Each incremental increase of the exposure value (for example, 1, 2, 3) results in a doubling of the amount of light received at the camera's sensor. Each incremental decrease (for example, 2, 1, 0, −1) results in a halving of the amount of light received at the camera's sensor.

In some embodiments, a digital camera may have an exposure compensation setting, also referred to as an exposure control setting. That is, a user can set the value of the exposure compensation setting (or exposure control setting) in order to increase or decrease the exposure value. In such cases, the system may automatically select a set of shutter-speed, aperture, and ISO values to arrive at the desired exposure value. Alternatively, some digital cameras may require independent adjustments to shutter-speed, aperture, and ISO values to adjust the exposure value.

As used herein, the term "exposure setting" includes any camera settings that affect the exposure. Exposure settings include aperture, shutter-speed, ISO, as well as exposure compensation (or exposure control) settings.

In the description, the term "image characteristic," or "image property," refers to features of an image such as exposure, contrast, white balance, color balance, brightness, color, color temperature, opacity, as well as other suitable features of an image. An image characteristic (or image property) may refer to a feature of an entire digital image, or to a feature of a portion (including, just a single pixel) of a digital image.

As used herein, the term "image lighting quality," or simply "image quality," refers to the quality of an image with respect to lighting, and can include exposure as well as other image characteristics such as contrast, brightness, white balance and so on. The embodiments describe systems and methods for optimizing the exposure or other image characteristics of a "facial region" that bounds a user's face within an image. An optimized exposure or other image characteristic may be determined according to suitable algorithms that analyze various image characteristics of the facial region and compare the values of the image characteristics to static or dynamic values, or ranges of values, which may be considered optimal for a given context. As described in further detail below, in some cases, optimal exposure and/or optimal values for various image characteristics may be provided as ranges. Moreover, in some cases, different values or ranges could be selected according to various inputs including information related to a user, such as information about the user's complexion.

Alternatively, in some embodiments, optimal exposure or other image characteristics can be determined by a user, who can select user-preferred settings for various devices (such as a camera or lighting device) that are automatically set whenever the system detects the user's face in a video feed.

All of these embodiments help solve the problem of exposure variability (and more broadly of image quality variability) among user's having different complexions.

FIG. 1 is a schematic view of a configuration 100 of networked computer systems that may be used to facilitate various user interactions, including video calls. The term "computer system" refers to the computing resources of a single computer, the partial computing resources of a single computer, a plurality of computers communicating with one another, or a network of remote servers. In the exemplary embodiment, a first computer system 102 is networked, via network 110, to a second computer system 120. In particular, using suitable software operating on first computer system 102 and second computer system 120, users of the computer systems can communicate using audio and video calling.

The embodiments also show an exemplary third computing system 130. Third computing system 130 may comprise a backend system that supports applications operating in first computer system 102 and/or second computer system 120. In the embodiment of FIG. 1, computer system 130 includes one or more computing devices 132 (for example, servers) that may be in communication with one or more databases 134. Databases 134 could be co-located with computing devices 132 or could be remote databases that are accessible by computing devices 132 over a network, including network 110. Databases 134 can include any kind of storage devices, including but not limited magnetic, optical, magneto-optical, and/or memory, including volatile memory and non-volatile memory.

A computer system interfacing directly with users, such as computer system 102, could operate in a client-server relationship with one or more servers of third computer system 130. For example, computer system 130 may include a server that communicates with first computer system 102 over network 110. First computer system 102 may provide the front-end of a system that facilitates interactions between users. For example, in one embodiment, first computer system 102 may be configured to run software through a web browser, in which the client software, as well as user information and data may be hosted on a server of third computer system 130. In other cases, first computer system 102 may run client software in the form of a native software application. In some cases, while the client software that allows users to perform various tasks may be run on first computer system 102, the data may be retrieved from and stored on databases associated with third computer system 130.

To facilitate interactions between users, each of computer system 102 and computer system 120 may include components to facilitate communication with external systems (for example, hardware and software components to enable communication over network 110). Each computer system may generally include a processor, a data storage component and a display (for example, computer system 102 includes display 103). Each computer system may further include one or more input devices. These could include a keyboard, mouse, or one or more physical buttons integrated into a case of the device. In some cases, a computer system includes touchscreen controls.

To enable video calls, each computer system could include a digital camera that is connected to the computer system. In the embodiment of FIG. 1, for example, computer system 102 includes a webcam 104. In the exemplary embodiment, webcam 104 is configured to attach (for example, clip) to display 103 of computer system 102. In other embodiments, webcam 104 could be integrated directly into display 103. In still other embodiments, a webcam could be a standalone camera. Moreover, the embodiments are not limited to using cameras that are configured specifically as webcams, and in other embodiments any suitable camera capable of capturing video can be used. For example, in another embodiment, a digital SLR camera could be used to capture video feeds and provide a real-time video feed to a connected computer system. In still another embodiment, a camera integrated into a smartphone could be used.

As described in further detail below, in some embodiments, a computer system could be connected to a lighting device. For example, in FIG. 1, computer system 102 is equipped with a lighting device 106. In this example, lighting device 106 is a light bar. As user herein, the term "light bar" refers to an elongated lighting device. In other embodiments, lighting devices with other suitable shapes or sizes could be used.

In the example of FIG. 1, second computer system 120 also includes a webcam 122. Although second computer system 120 does not include a lighting device, in other embodiments a lighting device could be connected to computer system 120.

It may be appreciated that the principles and ideas described herein could be applied to a variety of different applications. More generally, the principles and ideas described herein could be useful in any application where two or more users are participating in a video call.

Although the embodiments show computer systems comprising desktop computers, other embodiments could comprise any suitable computer systems, such as laptops, tablet computers, smart phones, or other suitable computer systems.

As already discussed, the embodiments provide systems and methods for improving the appearance of one or more users on a video call. More specifically, the embodiments provide systems and methods that can modify the exposure (and related image characteristics) of a video feed. In some contexts, this could be used to ensure that users with darker complexions are shown with an optimal exposure.

Figure 2:
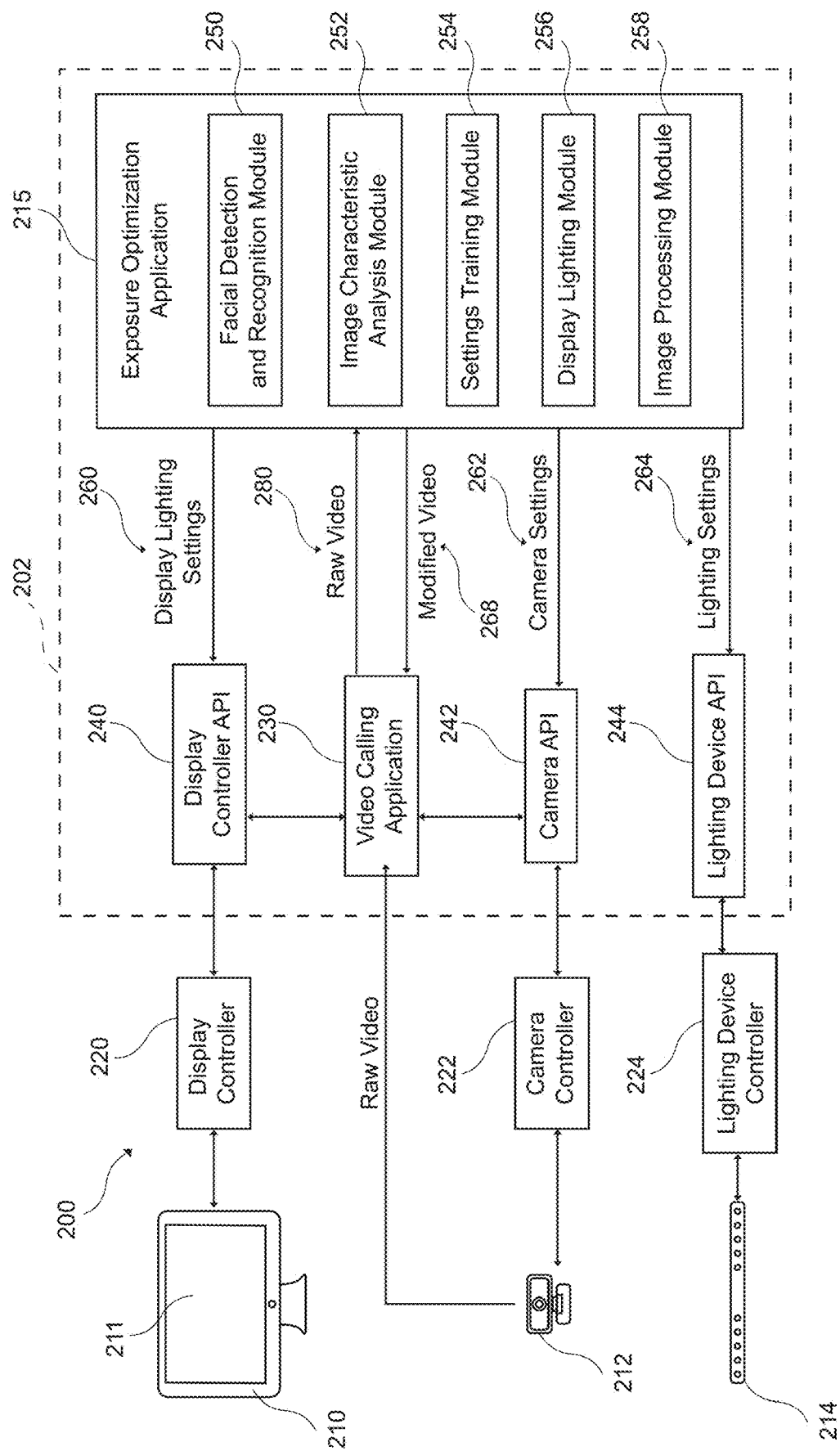
FIG. 2 is a schematic view of an architecture for a system that can be used to optimize the exposure of a face within a video feed, according to an embodiment.

FIG. 2 is a schematic view of an architecture 200 that facilitates optimizing the exposure of a video feed for different users, each of which may have different complexions.

In FIG. 2, a system 202 may include various components, including applications, modules, and APIs for receiving, processing, and sending information to external components. In this example, the external components include a display 210, a webcam 212, and a lighting device 214. In one embodiment, system 202 could comprise a single computer system. In other cases, some of the applications, modules, and APIs could be performed by two or more computer systems that may be networked together.

Each of the external devices connected to system 202 could include associated controllers. As user herein, the term "controller" refers to any combination of hardware and/or software that can be used to control one or more features of a device. In some cases, controllers could comprise drivers for a device.

In FIG. 2, display 210 is associated with a display controller 220, which includes various functionality for displaying data generated by system 202 as visual information (such as text and images) on the screen 211 of display 210. Webcam 212 is associated with a camera controller 222, which includes various functionality for controlling aspects of webcam 212. In particular, camera controller 222 may be used to change the settings of webcam 212, which could include an aperture setting, a shutter speed setting, and an ISO setting (the ISO setting of a digital camera controls how sensitive the camera's sensor is to light), as well as other suitable settings that are described in further detail below.

Lighting device 214 is associated with a lighting device controller 224. Lighting device controller 224 includes functionality for controlling settings of a lighting device. These can include the lighting direction, intensity, color, temperature, as well as other suitable lighting settings.

In some embodiments, a device controller can be disposed within a centralized computer system, such as system 202. In other embodiments, a device controller could be integrated into the corresponding device. For example, a camera controller could be integrated into a webcam. Moreover, in a given embodiment some device controllers may be disposed in a centralized computing device, while other device controllers could be integrated directly into the controlled devices. In still other embodiments, a device controller could be disposed within an intermediate system that is independent of the device and the computer system running various applications that rely on controlling the device.

Each device controller may be configured to communicate with an associated API of system 202. In the exemplary embodiment, system 202 uses a display controller API 240 (or simply "display API 240") to communicate with display controller 220. Additionally, system 202 uses a camera controller API 242 ("camera API 242") to communicate with camera controller 222. In addition, system 202 uses a lighting device controller API 244 ("lighting device API 244") to communicate with lighting device controller 224. Using the appropriate APIs, the applications and/or modules of system 202 may receive information from the device controllers, and/or send commands to the device controllers. In some cases, the various APIs shown in FIG. 2 could be replaced directly with device controllers, and corresponding APIs could be integrated into various applications running on system 202.

System 202 may further include a video calling application 230 that facilitates video calling between two or more users. Video calling application 230 could use any suitable software or protocol. Video calling application 230 may receive raw video directly from webcam 212. As used herein, the term "raw video" refers to video data as it is generated by a camera. In particular, raw video has not been processed by any software operating externally to the camera.

After processing raw video, video calling application 230 may pass the output video data to display controller API 240, so that the video data can be viewed by a user at display 210. In some embodiments, video calling application 230 may also communicate directly with camera API 242.

To help achieve optimal exposures for different users, system 202 may also include an exposure optimization application 215 ("optimization app 215"). In some cases, optimization app 215 could be integrated directly into video calling application 230 (or vice versa). However, in some embodiments, optimization app 215 can be a stand-alone application that communicates with video calling application 230 using any suitable application programming interfaces ("APIs").

Optimization app 215 may include various modules for facilitating processing of video data. These include a facial recognition module and detection module 250, an image characteristic analysis module 252, a settings training module 254, and a display lighting module 256.

Facial detection and recognition module 250 facilitates detecting and, in some cases, recognizing, user faces. Facial detection refers to the process of identifying a face within an image (or video feed), while facial recognition refers to the process of identifying a face as belonging to a particular person/user. As described in further detail below, the systems and methods may try to optimize the image characteristics (such as exposure) in a region surrounding the face of a user, rather than optimizing image characteristics across the whole image. Facial detection and recognition module 250 may make use of any suitable facial detection algorithms as well as any suitable facial recognition algorithms.

Image characteristic analysis module 252 facilitates identifying properties of an image (or of a region within an image) including, but not limited to: exposure, white balance, color balance, contrast, brightness, and color temperature.

Settings training module 254 facilitates training a system to recognize a user and to automatically implement user-preferred settings for devices (such as a camera or lighting device). The user-preferred settings may generally be settings for a device that optimize a particular image characteristic of a video feed.

Display lighting module 256 facilitates implementing a display-based light source. That is, a light source created by adjusting the visual properties of a portion of a display screen. Display lighting module 256 may include functionality for designating particular regions of the screen for illumination, while designating other regions for use by other applications running on the computer system, such as a video calling application.

In operation, raw video 280 from webcam 212 is fed into video calling application 230, which outputs at least some of the video information to the display via the display API 240. When optimization app 215 is being used, video calling application 230 may also feed some or all of the raw video data to optimization app 215.

Optimization app 215 processes the raw video data, using one or more of the modules described above. Based on this processing, optimization app 215 may generate various commands to change the settings of one or more external devices. For example, optimization app 215 can generate display lighting settings 260 and deliver those settings to display controller API 240. Likewise, optimization app 215 can generate camera settings 262 and deliver those settings to camera API 242. Moreover, optimization app 215 can generate lighting settings 264 and deliver those settings to lighting device API 244. The downstream effects of adjusting the settings of one or more external devices is a change in the image characteristics of the raw video data generated by webcam 212. Moreover, these changes may be made incrementally and/or continuously to arrive at a high quality video feed that is optimally exposed to improve the appearance of users depending on complexion, background lighting conditions, or other factors.

It may be appreciated that in different embodiments, optimization app 215 can operate to modify the settings of different external devices. Moreover, in some embodiments, some of the modules comprising optimization app 215 may be optional.

In some embodiments, exposure optimization application 215 may further include an optional image processing module 258. Image processing module 258 may be used to modify one or more images received as part of a raw video feed. The modified images could then be delivered to video calling application 230, which passes the modified video data ("modified video 268") on to display 210 via display controller API 240. However, in embodiments where image processing is not used, the video feed displayed for a user may be raw video, a subset of the raw video (for example, a portion of the full video resolution), or a suitably compressed version of the raw video. In particular, when the system changes only camera or lighting settings and does not apply image processing to the raw feed that is output from the camera, the exposure and/or image characteristics such as contrast, brightness, color, color temperature, white balance, color balance, or other suitable characteristics are modified by the camera itself, or by modifying the external lighting shone on the user. In such configurations, significant computational processing time can be saved since the computer system is not required to render or otherwise transform images (apart from any transformations done by the video calling application itself).

It may be appreciated that the present architecture could be deployed at any computer system participating in a video call.

Figure 3:
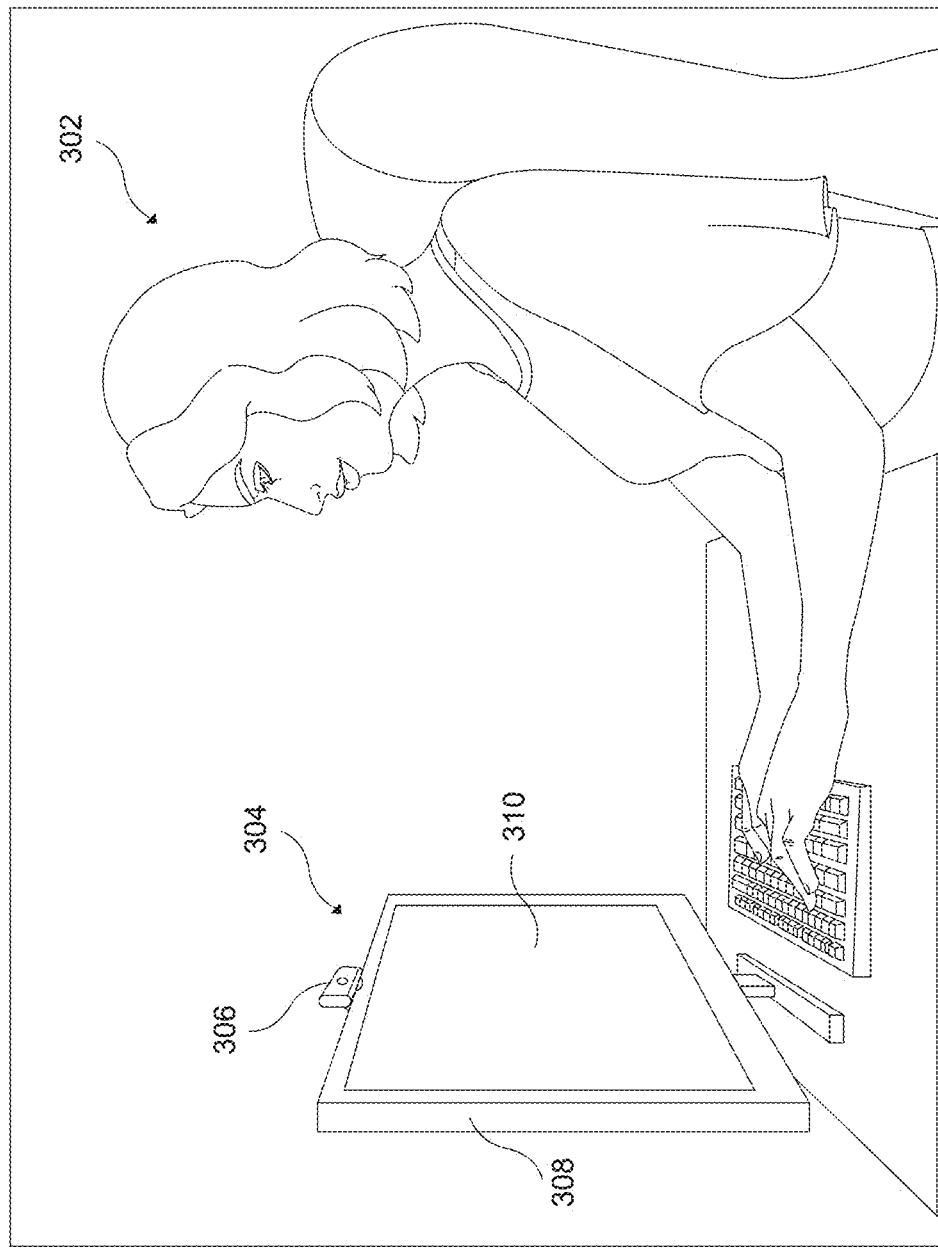
FIG. 3 is a schematic view of an exemplary configuration in which a user has a computer system with a webcam, according to an embodiment.

FIG. 3 is a schematic view of an exemplary scenario in which a user 302 is interacting with another user (not shown) through a video calling application running on computer system 304. In this exemplary scenario, user 302 could be a customer service agent or representative on a video call with a customer. The embodiment of FIG. 3 includes a webcam 306 connected to computer system 304. Computer system 304 also includes a display 308 with a display screen 310.

Figure 4:
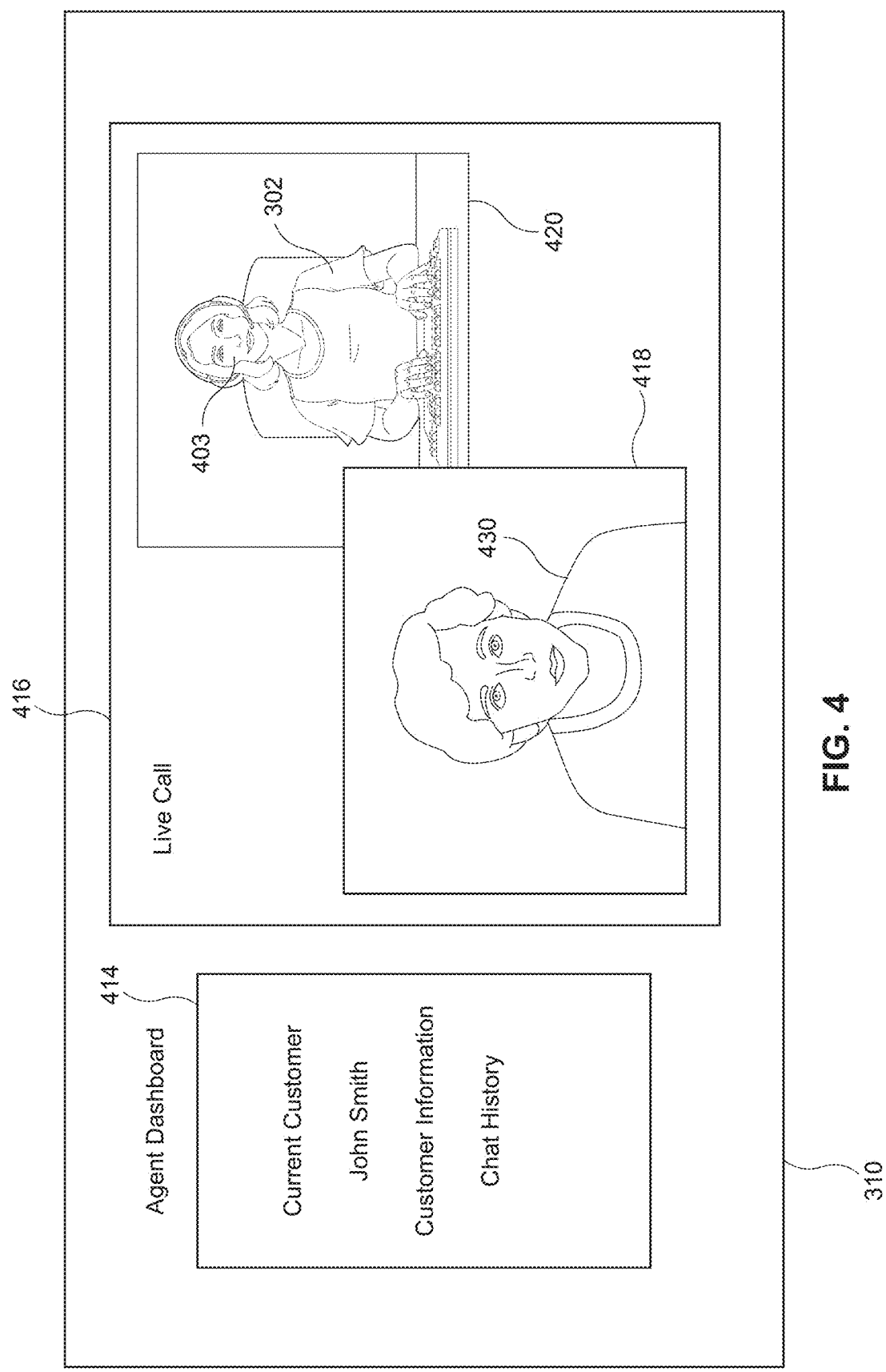
FIG. 4 is a schematic view of a dashboard UI for a user that includes video feeds of an ongoing video call, according to an embodiment.

FIG. 4 is a schematic view of the content displayed on display screen 310, which is visible to user 302. Specifically, display screen 310 shows an agent dashboard application, which further includes a customer window 414 and a live call window 416. Within live call window 416, user 302 can see a first video feed 418 showing a customer 430. In addition, live call window 416 may show a second video feed 420 of user 302.

Using conventional webcam technology, users with darker complexions may face problems with exposure in the video feed showing the user. For example, in FIG. 4, second video feed 420 may be poorly exposed, so that it is difficult to make out features of face 403 of user 302. This may happen because the default settings on webcam 306 are not optimized to create an exposure for video feed 420 that accurately renders face 403 with respect to contrast, brightness, temperature color, or other suitable image characteristics.

In order to modify the exposure of second video feed 420, the embodiments provide systems and methods for automatically analyzing the image characteristics of second video feed 420 and for automatically adjusting camera settings for webcam 306 to produce a modified video feed with an exposure that is optimized to better show face 403 of user 302.

In order to optimize the exposure of a user's face within a video feed, the embodiments may utilize facial detection technology to automatically identify a face within a video feed. However, facial detection algorithms may rely on a video feed having a suitable exposure for a given subject in order to identify features of a face that stand out against a background. For users with darker complexions, the default exposure of a video feed may result in images where the face is not sufficiently distinct from the background to be detected by the facial detection algorithm.

The embodiments may provide systems and methods that can automatically identify faces when the default camera exposure is poor. This is accomplished by automatically adjusting contrast and/or other camera settings until a facial recognition algorithm is able to identify a face within a video feed.

Figure 5:
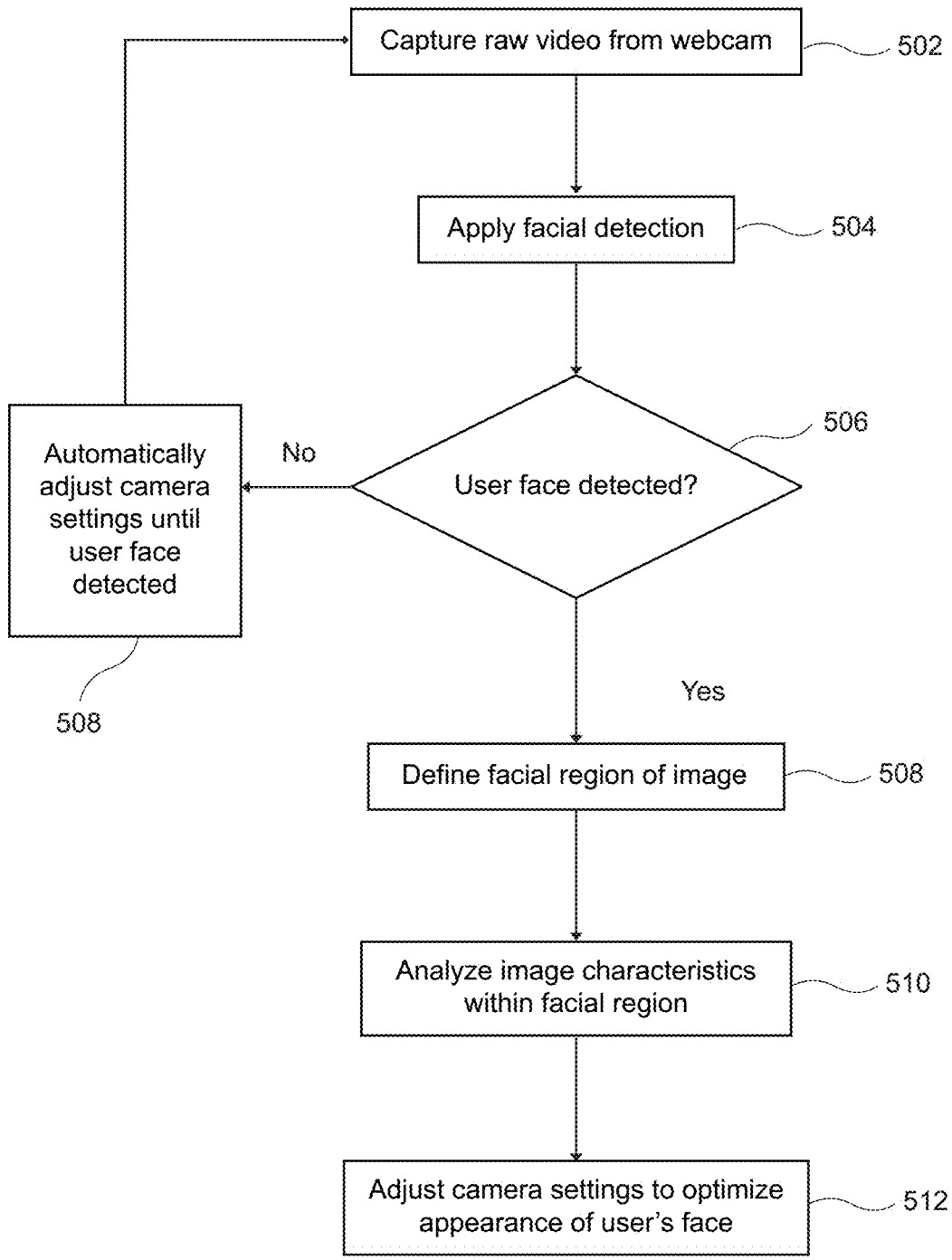
FIG. 5 is a schematic view of a process for automatically adjusting camera settings of a camera to optimize the appearance of a user's face, according to an embodiment.

FIG. 5 is a schematic view of a method for automatically adjusting camera settings to first identify a user's face, and then to achieve an optimal exposure and/or appearance for a user's face within a video feed. It may be appreciated that one or more of the following systems could be performed by any suitable system running an exposure optimization algorithm, such as system 202 described above and shown in FIG. 2.

Starting in step 502, system 202 may capture raw video from a webcam. Next, in step 504, system 202 may apply one or more facial detection algorithms to the raw video in order to detect a user's face within the image. In step 506, system 202 determines if a face has been detected. If no face has been detected, system 202 proceeds to step 508.

In step 508, system 202 may automatically adjust camera settings until a user's face has been detected. For example, system 202 could automatically adjust the contrast setting of a camera and reanalyze the resulting raw video until the facial detection algorithm detects a face. Alternatively, system 202 could automatically adjust brightness, white balance, or other camera settings until a face can be detected. In some cases, system 202 could automatically adjust the aperture, shutter speed, and/or ISO settings of a camera until a face can be detected.

Once a face has been detected in step 506, system 202 proceeds to step 508. In step 508, system 202 defines a facial region of the image. This may be any region with a suitable boundary that encloses the face detected in step 504. For example, the facial region could be a circular region around the face, a square region around the face, or any other suitably shaped region. Once the face has been detected, the facial region can be configured to "follow" the face whenever the user moves around within the video feed.

Next, in step 510, system 202 may analyze the image characteristics of the video feed within the defined facial region. In some cases, the image analysis could be performed by an image characteristics analysis module (such as image characteristics analysis module 252 of FIG. 2). As already mentioned, analyzing the image characteristics within the facial region, as opposed to analyzing the image characteristics of the whole video feed, may help in optimizing the exposure of the video feed so that the user's face can properly exposed.

Figure 6:
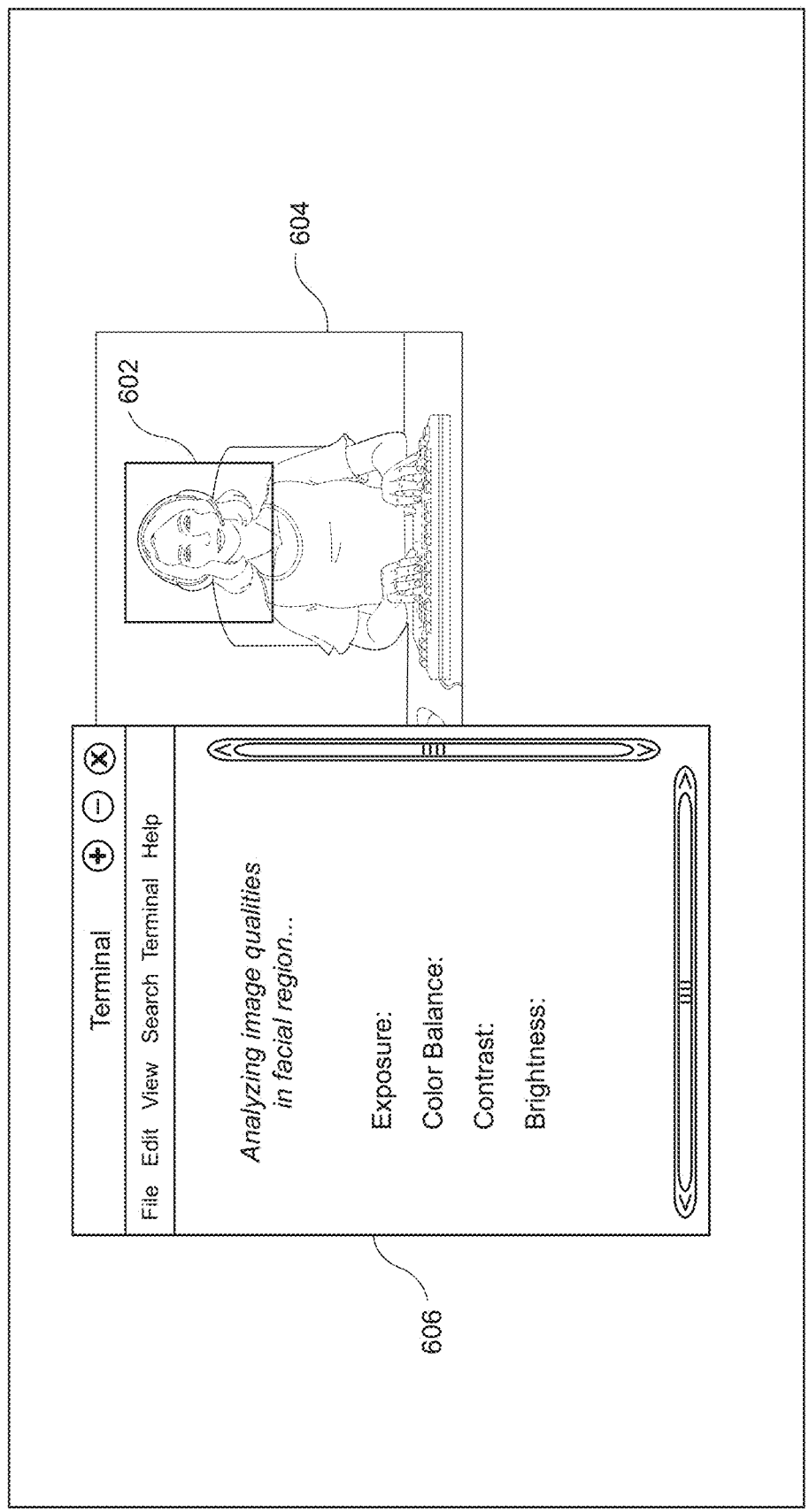
FIG. 6 is a schematic view of a step of analyzing the image qualities of a facial region of a video feed, according to an embodiment.

As an example, FIG. 6 shows a schematic view of a facial region 602 within a video feed 604, which is being analyzed. In this example, the analysis, represented schematically as a script running in terminal window 606, processes the pixels within facial region 602 to determine numerical values for one or more image characteristics. In this example, the process analyzes "Exposure", "Color Balance," "Contrast," and "Brightness." However, it may be appreciated that in other embodiments any suitable image characteristics could be analyzed.

Referring back to FIG. 5, in step 512, system 202 may automatically adjust the camera settings to optimize the appearance of the user's face. In some cases, this includes optimizing the exposure of the user's face.

Figure 7:
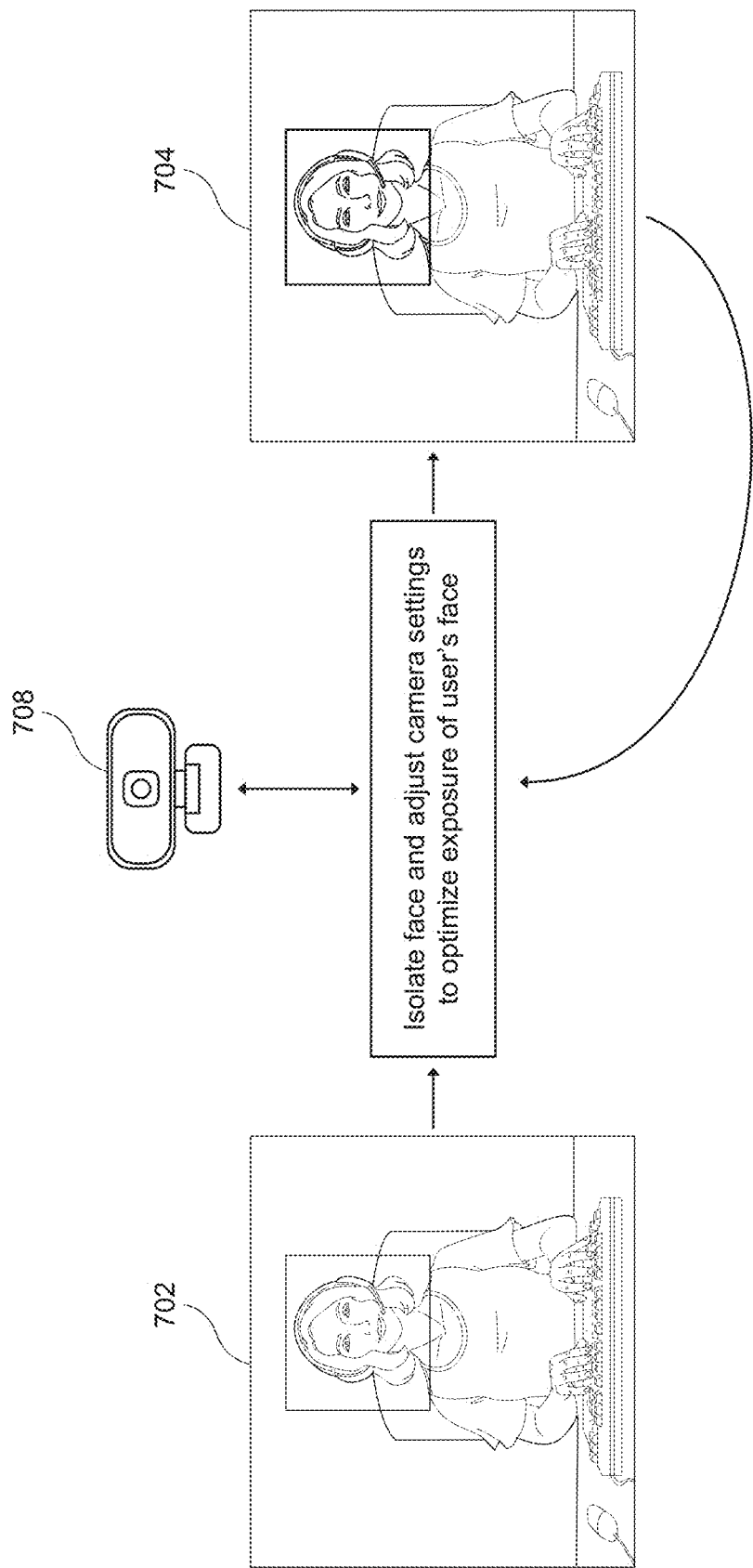
FIG. 7 is a schematic view of a process for continuously analyzing images and adjusting camera settings to optimize the exposure of a user's face, according to an embodiment.

FIG. 7 is a schematic view showing how the exemplary system may continuously analyze images and adjust camera settings to optimize the exposure of a user's face. In this case, an initial video feed 702 is received. This initial video feed is then processed by isolating a face within the video and automatically adjusting the camera settings to optimize the exposure of the user's face. The changes in the camera settings cause changes in the image characteristics of the video feed, represented in FIG. 7 as modified video feed 704. It may be appreciated that both initial video feed 702 and modified video feed 704 comprise raw video feeds output by camera 708. The distinction between the two feeds is that the camera settings have been modified so that the resulting raw images have different exposures (indicated schematically in the figures using different line weights).

Figure 8:
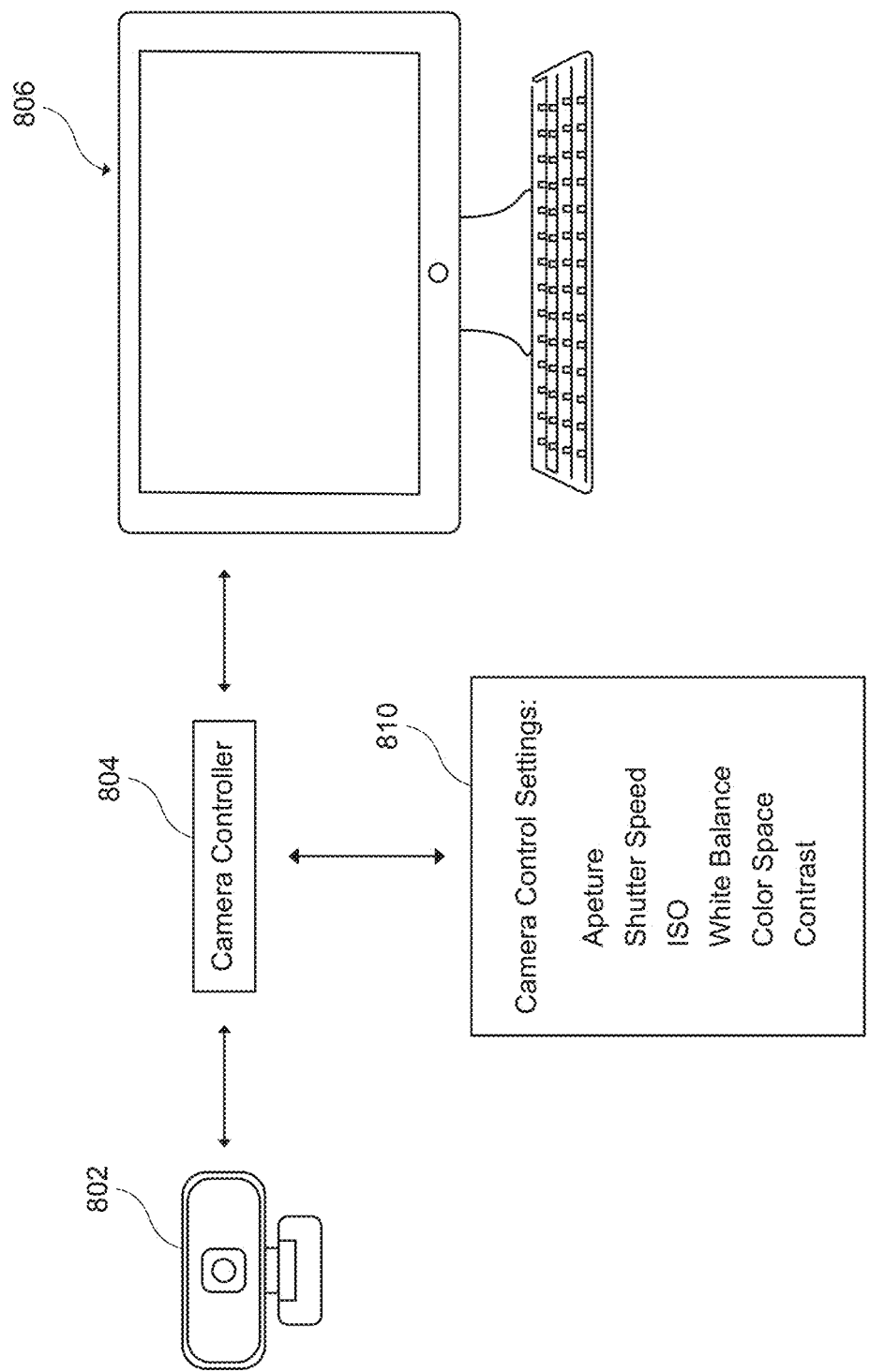
FIG. 8 is a schematic view of a camera controller and associated camera control settings, according to an embodiment.

FIG. 8 is a schematic view showing various camera settings for a camera 802 that can be adjusted by an application running on a computing device 806 using a camera controller 804. These camera control settings 810 include, but are not limited to "Aperture", "Shutter Speed," "ISO," "White Balance," "Color Space," and "Contrast." It may be appreciated that different digital cameras could provide different customizable settings. Moreover, some of the camera controls correspond to direct control of electro-mechanical aspects of the camera, such as shutter speed, ISO, and aperture, while others may correspond to indirect controls. In some cases, some camera settings may not be independent, so that a camera may automatically adjust multiple camera settings to achieve a user selected value for another setting. For example, the system could automatically adjust aperture, shutter speed and ISO to achieve a user selected value for a contrast control.

Figure 9:
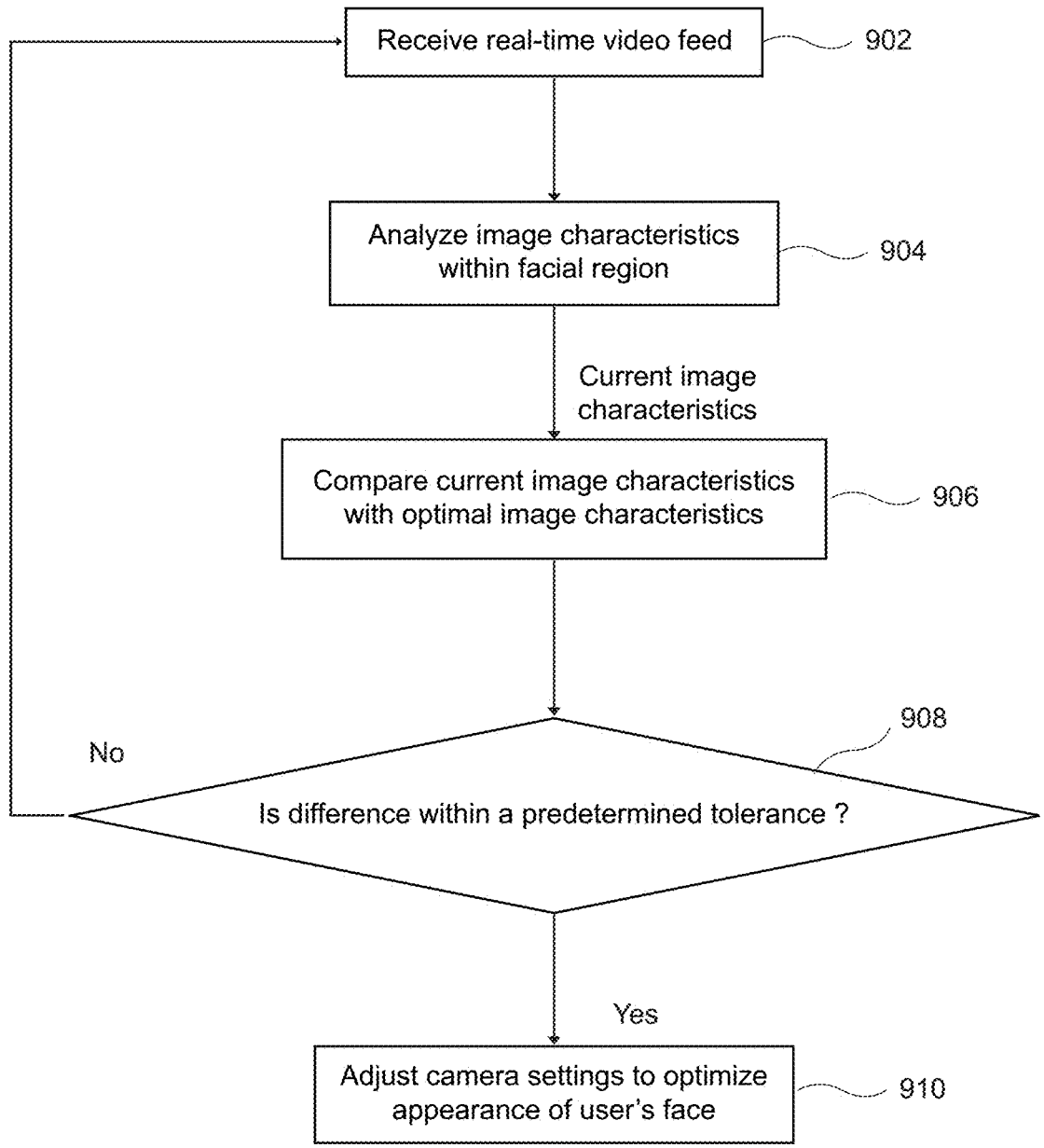
FIG. 9 is a schematic view of a process for automatically adjusting camera settings until the resulting image characteristics are optimized, according to an embodiment.

FIG. 9 is a schematic view of a process for automatically modifying camera settings to achieve an optimal appearance for a user's face, according to an embodiment. Starting in step 902, system 202 could receive a real-time video feed from a webcam. Next, in step 904, system 202 could analyze image characteristics within a previously defined facial region. In step 906, system 202 may compare the current image characteristics (outputs of step 904) with a set of optimal image characteristics. The optimal image characteristics can be specific camera settings, or ranges of settings, that have been found to improve the exposure of a user's face, and may apply to users of various complexions.

In some cases, it may be appreciated, optimal image characteristics could be determined as a function of one or more inputs, which may include the current image characteristics. In particular, in some cases, the optimal image characteristics could vary according to information gathered from the video feed about the user's complexion. Thus, in some cases, the system could retrieve a first set of optimal image characteristics for user's having a first complexion, and a second set of optimal image characteristics for user's having a second complexion. In still other embodiments, the system could receive inputs from a user that are indicative of the user's complexion.

In step 908, the system checks to see if the difference between the current image characteristics and the optimal image characteristics is within a predetermined tolerance. If so, the system returns to step 902 to continue analyzing the video feed for deviations from the optimal image characteristics.

If the difference between the current image characteristics and optimal image characteristics is greater than the predetermined tolerance, than system 202 may proceed to step 910. In step 910, system 202 may automatically adjust the camera settings to achieve an optimal appearance (or exposure) for the user's face.

In one possible implementation of the exemplary system and method, a system may calculate an exposure for a facial region according to the following steps: first, the facial region is converted to greyscale. Next, the arithmetic mean of all the pixels in the face image may be found, yielding a number between 0 and 255. In some cases, the system could impose a threshold of 127, which corresponds to the halfway point between 0 and 255. If the arithmetic mean of the facial region is below 127, the image is determined to be too dark and the system proceeds accordingly to increase the exposure by adjusting the camera settings. If the arithmetic mean of the facial region is above 127, the image is determined to be too bright, and the system proceeds accordingly to decrease the exposure by adjusting the camera settings. In this way, the camera settings may be continuously adjusted until the arithmetic mean of the (grey-scaled) facial region is exactly 127. In still other implementations, the ideal exposure value could be defined in a range, or band, around 127. For example, the camera settings can be adjusted until the exposure of the facial region has a value between 125 and 129. In still other embodiments, other suitable ranges of values could be used.

In still other embodiments, instead of using the arithmetic mean of pixels in the facial region, another suitable function on the pixels could be used. Moreover, in some cases, the value of 127 (and a suitable band around 127) may be adjustable by users, so that users can opt to have generally lighter or darker images.

Similar calculations could be performed for adjusting other image characteristics. For example, if a system automatically adjusts camera settings to achieve a particular color temperature in the facial region of the resulting video feed, the system could apply suitable functions (such as the arithmetic mean) to the hue and/or saturation values of pixels in the facial region.

Moreover it may be appreciated that these same methods for trying to identify ideal exposure values or ranges of exposure values for the facial region within a video feed may be applied to later embodiments, including embodiments where lighting settings (rather than camera settings) are adjusted to change the exposure of the video feed.

In some embodiments, a system could make use of a lighting device to adjust the exposure of a video feed, and thus provide an optimal appearance for a user's face.

Figure 10:
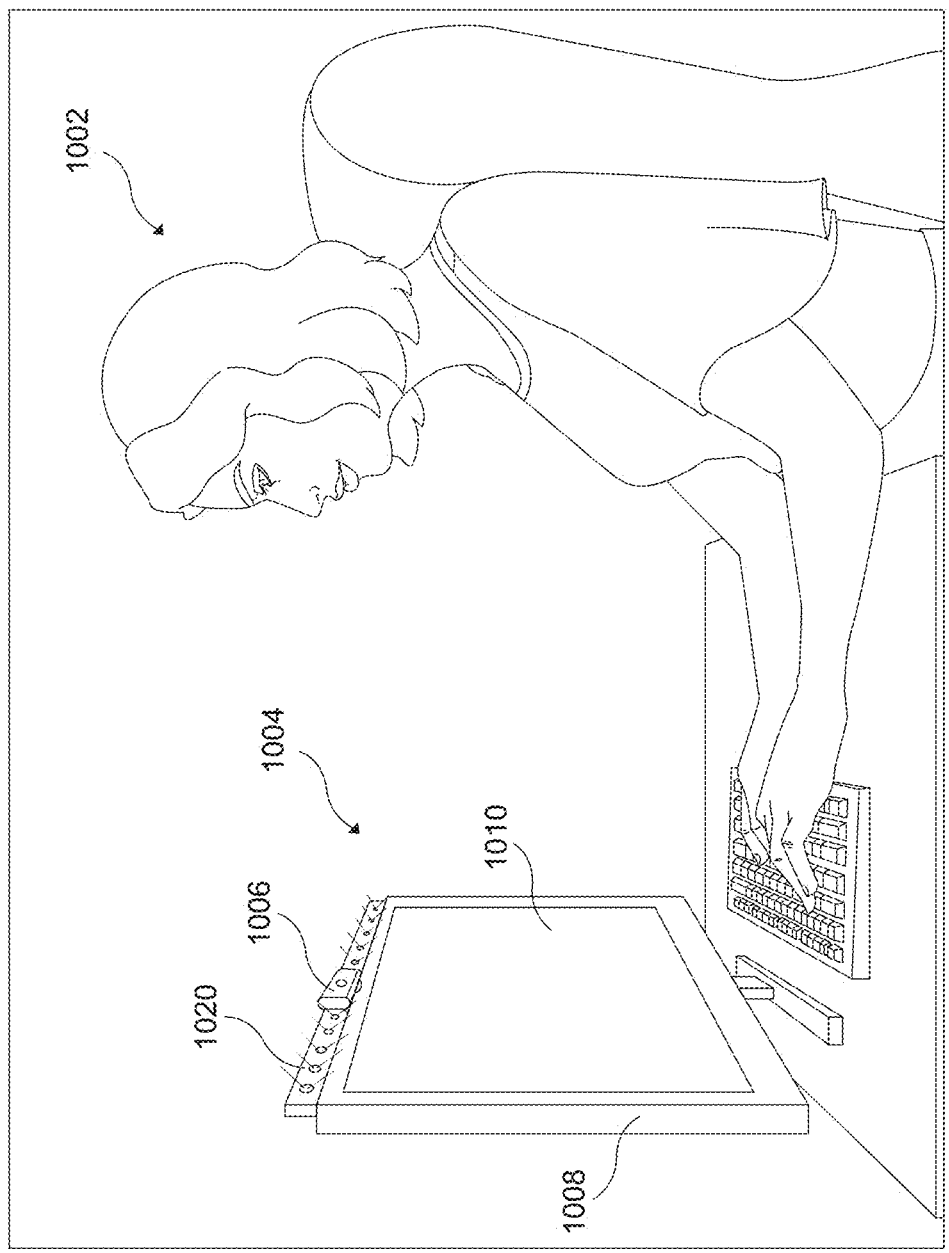
FIG. 10 is a schematic view of an exemplary configuration in which a user has a computer system with a webcam and an external lighting device, according to an embodiment.

FIG. 10 is a schematic view of another exemplary scenario in which a user 1002 is interacting with another user (not shown) though a video calling application running on computer system 1004. In this exemplary scenario, user 1002 could be a customer service agent or representative on a video call with a customer. The embodiment of FIG. 10 includes a webcam 1006 connected to computer system 1004. Computer system 1004 also includes a display 1008 with a display screen 1010. Additionally, in the embodiment of FIG. 10, a lighting device 1020 is connected with computer system 1004. Lighting device 1020 may be positioned on display 1008 so that lighting device 1020 can be used to illuminate the face of user 1002. By adjusting the lighting properties of lighting device 1020, an application running on computer system 1004 can automatically adjust the exposure of the video feed captured by webcam 1006.

In order to optimize the exposure of user's face within a video feed, the embodiments may utilize facial detection technology to automatically identify a face within a video feed. However, facial detection algorithms may rely on a video feed having a suitable exposure for a given subject in order to identify features of a face that stand out against a background. For users with darker complexions, the default exposure of a video feed may result in images where the face is not sufficiently distinct from the background to be recognized by the facial detection algorithm.

The embodiments may provide systems and methods that can automatically identify faces when the default camera exposure poor. This is accomplished by automatically adjusting lighting settings of a lighting device that is configured to illuminate a user's face. This adjustment may be done repeatedly until a facial recognition algorithm is able to identify a face within a video feed.

Figure 11:
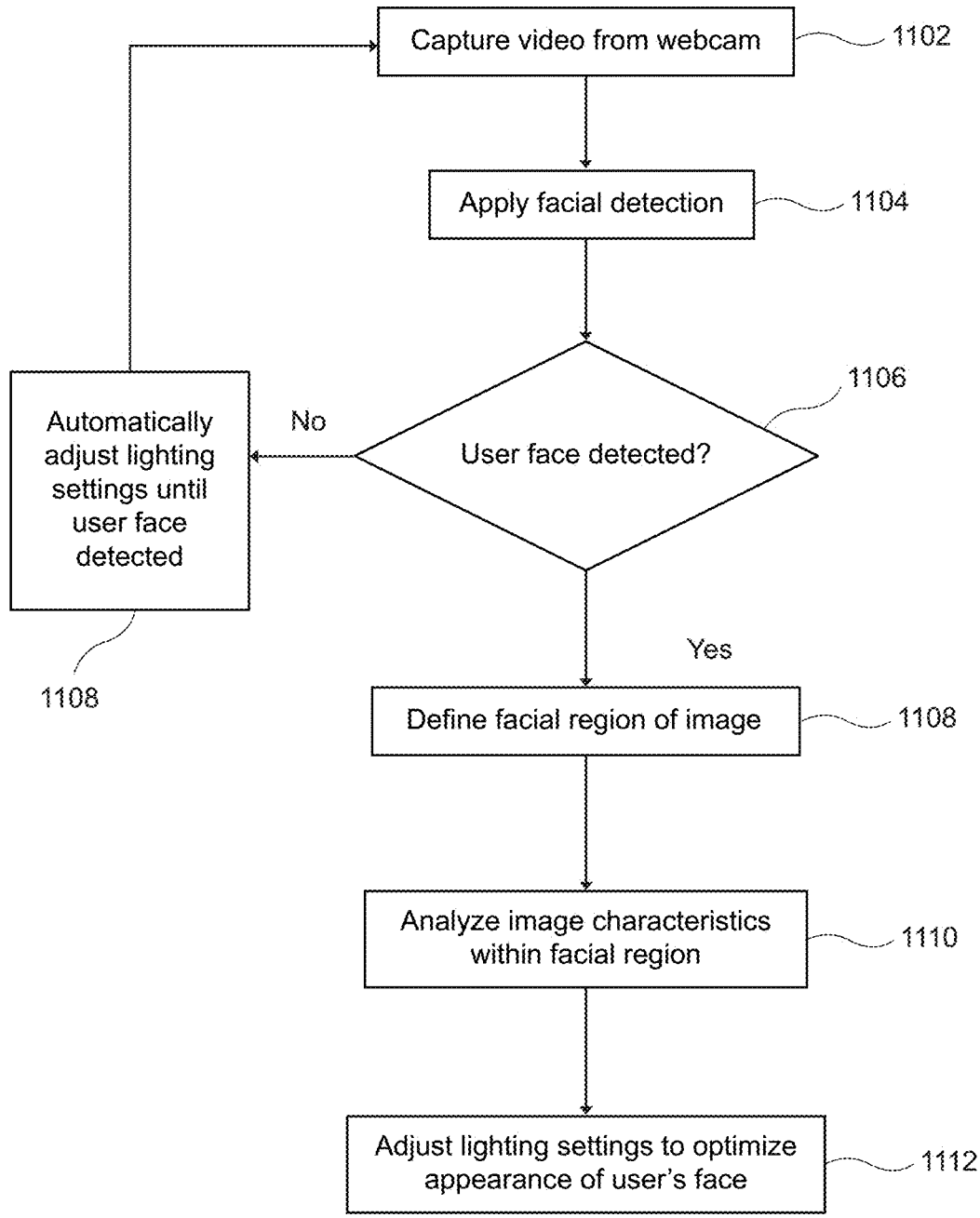
FIG. 11 is a schematic view of a process for automatically adjusting lighting settings to arrive at an optimal appearance for a user's face.

FIG. 11 is a schematic view of a method for automatically adjusting camera settings to first identify a user's face, and then to achieve an optimal exposure and/or appearance for a user's face within a video feed. It may be appreciated that one or more of the following systems could be performed by any suitable system running an exposure optimization algorithm, such as system 202 described above and shown in FIG. 2.

Starting in step 1102, system 202 may capture raw video from a webcam. Next, in step 1104, system 202 may apply one or more facial recognition algorithms to the raw video in order to detect a user's face within the image. In step 1106, system 202 determines if a face has been detected. If not face has been detected, system 202 proceeds to step 1108.

In step 1108, system 202 may automatically adjust the lighting settings of a lighting device until a user's face has been detected. For example, system 202 could automatically adjust the intensity of the light and reanalyze the resulting raw video until the facial detection algorithm detects a face. Alternatively, system 202 could automatically adjust the color, direction, or other properties of the lighting settings until a face can be detected.

Once a face has been detected in step 1106, system 202 proceeds to step 1108. In step 1108, system 202 defines a facial region of the image. This may be any region with a suitable boundary that encloses the face detected in step 1104. For example, the facial region could be a circular region around the face, a square region around the face, or any other suitably shaped region. Once the face has been detected, the facial region can be configured to "follow" the face whenever the user moves around within the video feed.

Next, in step 1110, system 202 may analyze the image characteristics of the video feed within the defined facial region. In some cases, the image analysis could be performed by an image characteristics analysis module (such as image characteristics analysis module 252). As already mentioned, analyzing the image characteristics within the facial region, as opposed to analyzing the image characteristics of the whole video feed, may help in optimizing the exposure of the video feed so that the user's face can properly exposed. In step 1112, system 202 may automatically adjust the lighting settings of a lighting device to optimize the appearance of the user's face.

As described in further detail below, lighting can be provided by illuminating regions of a user's display. In such embodiments, the method of detecting a user's face automatically can be achieved by adjusting the lighting settings of the illuminated regions of the user's display.

Figure 12:
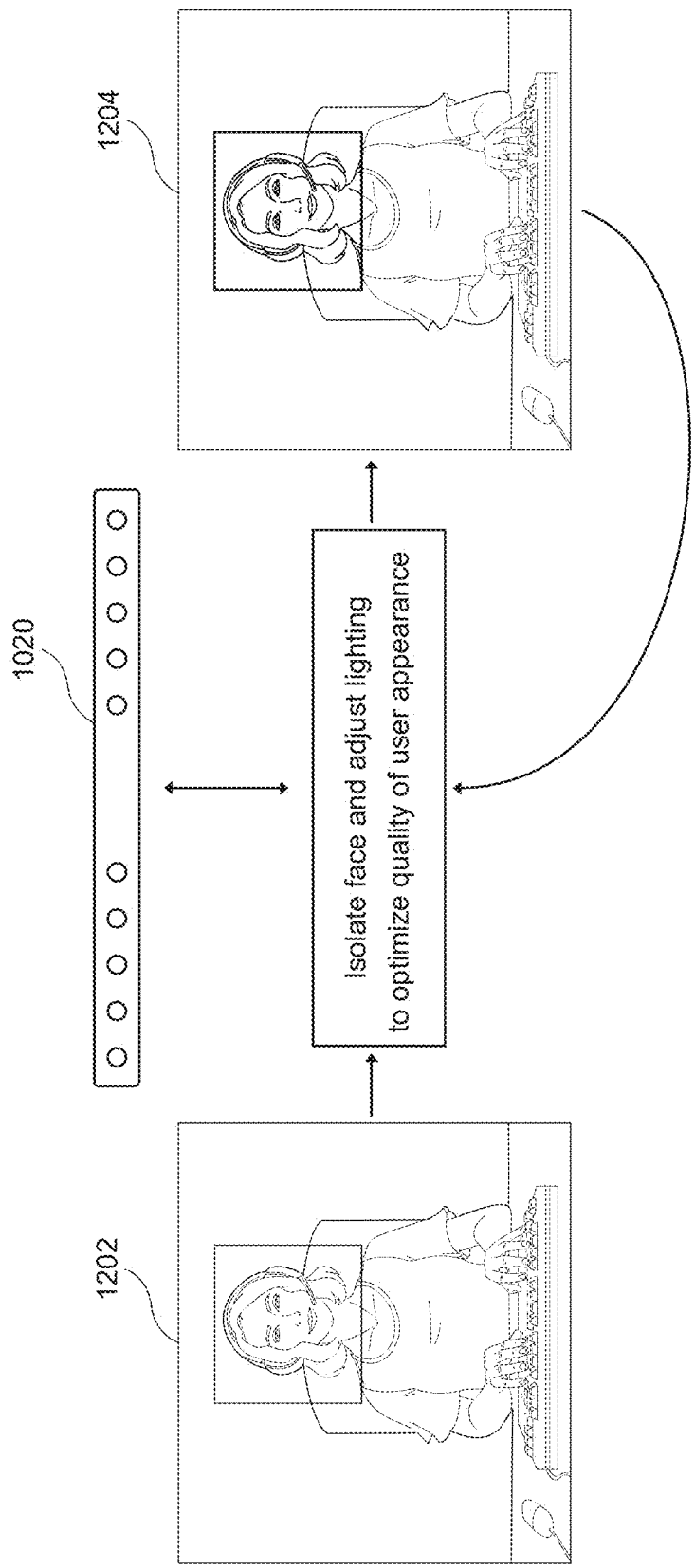
FIG. 12 is a schematic view of a process for continuously analyzing images and adjusting lighting settings to optimize the exposure of a user's face, according to an embodiment.

FIG. 12 is a schematic view showing how the exemplary system may continuously analyze images and adjust lighting settings to optimize the exposure of a user's face. In this case, an initial video feed 1202 is received. This initial video feed is then processed by isolating a face within the video and automatically adjusting the lighting settings to optimize the exposure of the user's face. The changes in the camera settings cause changes in the image characteristics of the video feed, represented in FIG. 12 as modified video feed 1204. It may be appreciated that both initial video feed 1202 and modified video feed 1204 comprise raw video feeds output by webcam (such as webcam 1006 of FIG. 10). The distinction between the two feeds is that the lighting settings have been modified so that the resulting raw images have different exposures (indicated schematically in the figures using different line weights).

Figure 13:
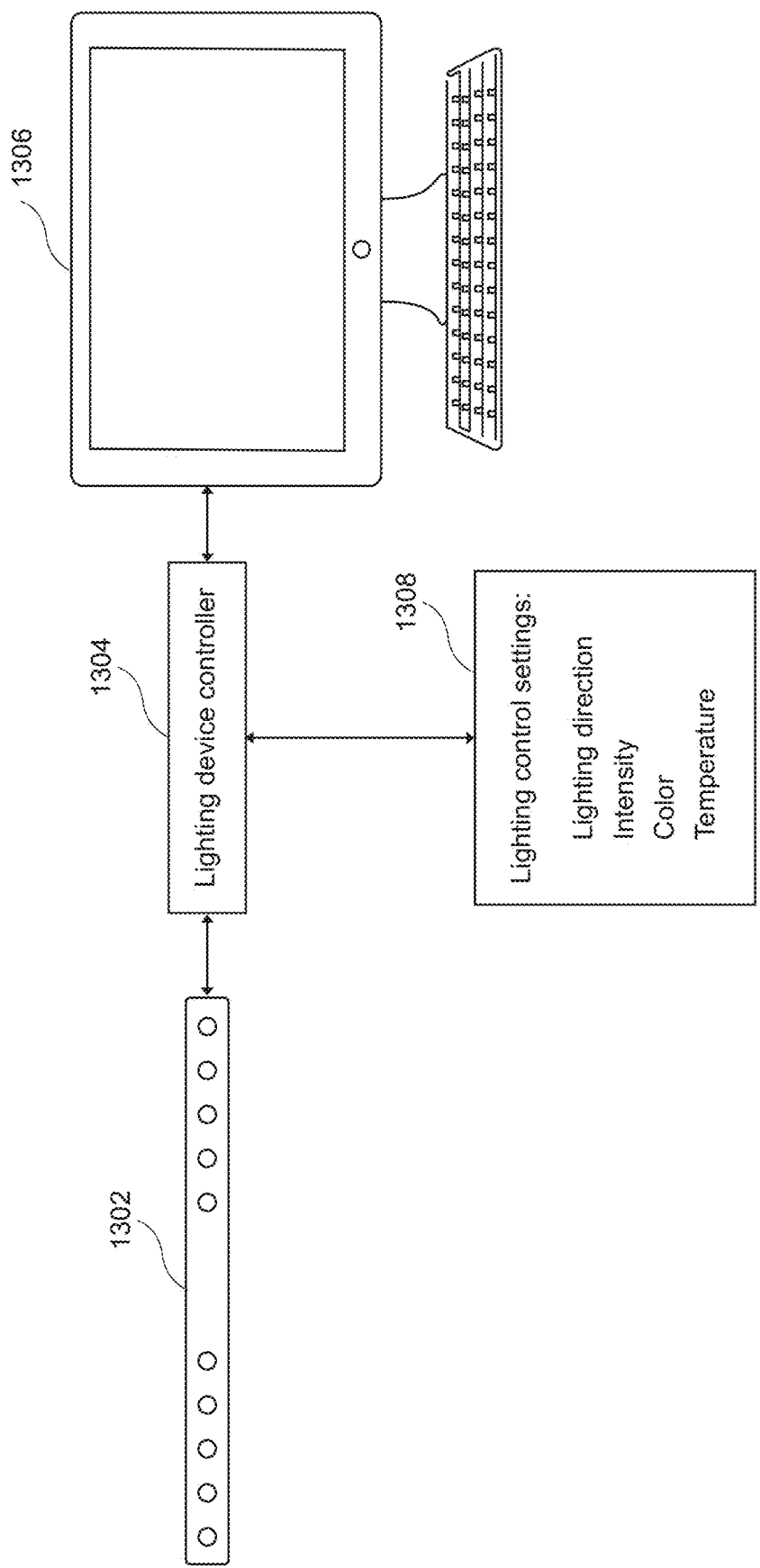
FIG. 13 is a schematic view of a lighting device controller and associated lighting control settings, according to an embodiment.

FIG. 13 is a schematic view showing various lighting control settings (or, simply, "lighting settings") for a lighting device 1302 that can be adjusted by an application running on a computer system 1306 using a lighting device controller 1304. The lighting control settings 1308 include, but are not limited to "Lighting direction," "intensity," "color," and "temperature." It may be appreciated that different lighting devices could provide different customizable settings. In some cases, a lighting device could be configured with a single light source, which is either rounded or elongated, for example. In other cases, a lighting device could be configured with multiple light sources (for example, multiple LED bulbs) that may be arranged in any suitable configuration. Exemplary configurations include light sources arranged in a linear configuration or in a ring-like configuration. In some cases including multiple light sources, the lighting device controller may allow for independent control of each light source. This would allow a system to automatically adjust the intensity, color, temperature, direction, or other features of each light source.

In some embodiments, it may be helpful to add a highlight color to a face using a lighting device in order to create an ideal exposure or otherwise improve the image quality. For example, a lighting device could be configured to shine a blue or magenta light on some portions of a user's face. In some cases, the highlight color could be projected only onto to one (or both) sides of a user's face, and may not be projected directly onto the front of the user's face.

Figure 14:
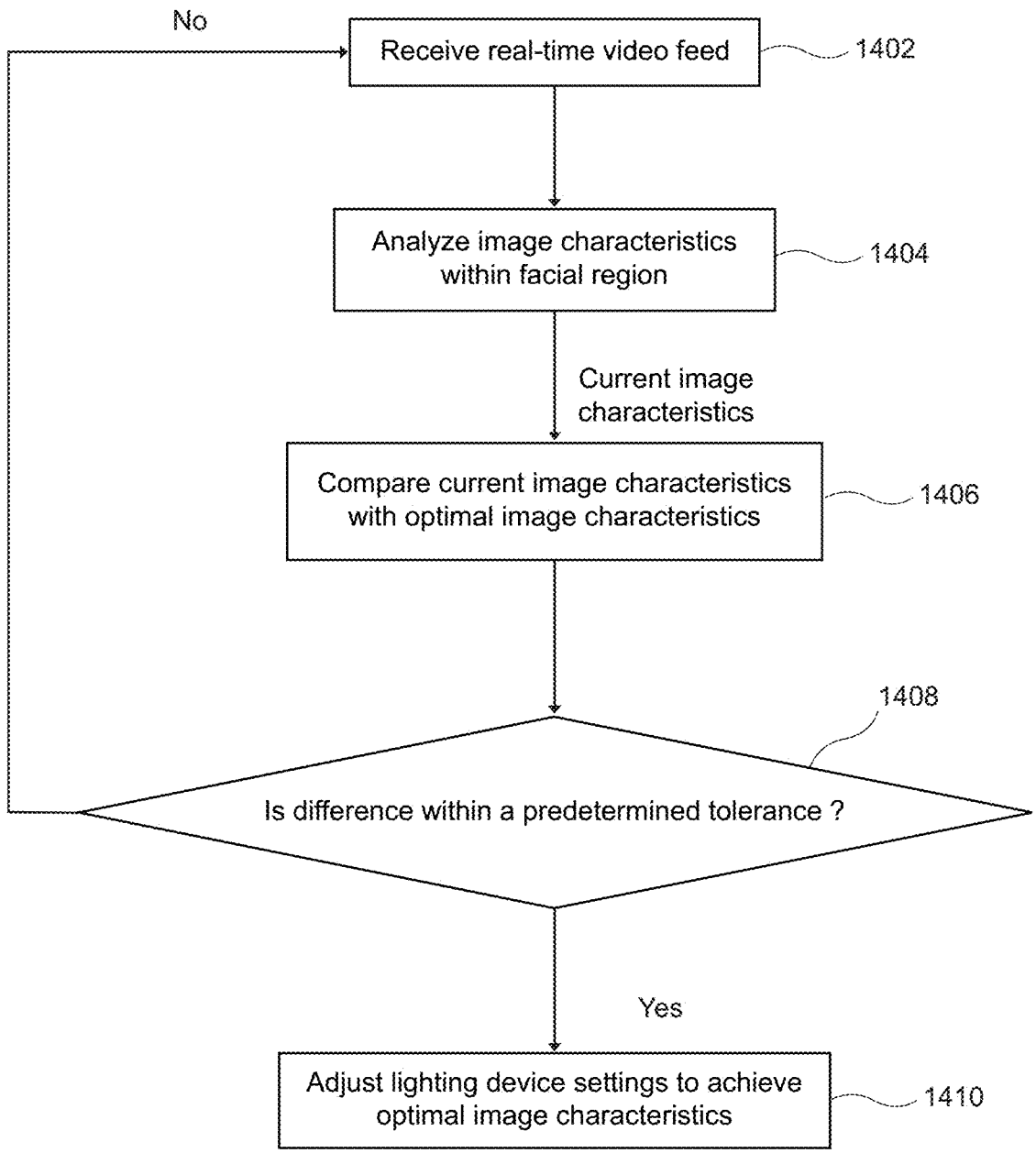
FIG. 14 is a schematic view of a process for automatically adjusting lighting settings until the resulting image characteristics of a video feed are optimized, according to an embodiment.

FIG. 14 is a schematic view of a process for automatically modifying lighting settings to achieve an optimal appearance for a user's face, according to an embodiment. In some cases, the lighting settings may be used to control a discrete lighting device that is connected to a computer system. In other cases, the lighting settings may be used to control an illuminated region of a display screen.

Starting in step 1402, system 202 could receive a real-time video feed from a webcam. Next, in step 1404, system 202 could analyze image characteristics within a previously defined facial region. In step 1406, system 202 may compare the current image characteristics (outputs of step 1404) with a set of optimal image characteristics. The optimal image characteristics can be specific lighting settings, or ranges of settings, that have been found to improve the exposure of a user's face, and may apply to users of various complexions.

In some cases, it may be appreciated, optimal image characteristics could be determined as a function of one or more inputs, which may include the current image characteristics. In particular, in some cases, the optimal image characteristics could vary according to information gathered from the video feed about the user's complexion. Thus, in some cases, the system could retrieve a first set of optimal image characteristics for user's having a first complexion, and a second set of optimal image characteristics for user's having a second complexion. In still other embodiments, the system could receive inputs from a user that are indicative of the user's complexion.

In step 1408, the system checks to see if the difference between the current image characteristics and the optimal image characteristics is within a predetermined tolerance. If so, the system returns to step 1402 to continue analyzing the video feed for deviations from the optimal image characteristics.

If the difference between the current image characteristics and optimal image characteristics is greater than the predetermined tolerance, than system 202 may proceed to step 1410. In step 1410, system 202 may automatically adjust the lighting settings to achieve an optimal appearance (or exposure) for the user's face.

It may be appreciated that a comparison between image characteristics detected in a video feed and optimal image characteristics may include comparing the difference to a predetermined threshold, as above, or using any other suitable metric for comparing the detected image characteristics with optimal image characteristics. In another embodiment, for example, a system could store a range of values for each optimal image characteristic, and the method could include checking to see if the detected image characteristic has a value that is in the range of values associate with an optimal image characteristic.

In some embodiments, rather than control the lighting settings of a stand-alone lighting device, a system could be configured to control an illuminated region of a display screen. Referring back to FIG. 2, system 202 may include display lighting module 256 that can automatically generate one or more illuminated regions on a display screen. Moreover, display lighting module 256 can adjust lighting settings associated with the illuminated regions. For example, display lighting module 256 could adjust the direction, intensity, color, and color temperature of illuminated regions. The illuminated regions could then project light onto the user's face that is captured by a camera and therefore can be used to adjust the image characteristics (such as exposure) of the raw video.

Figure 15:
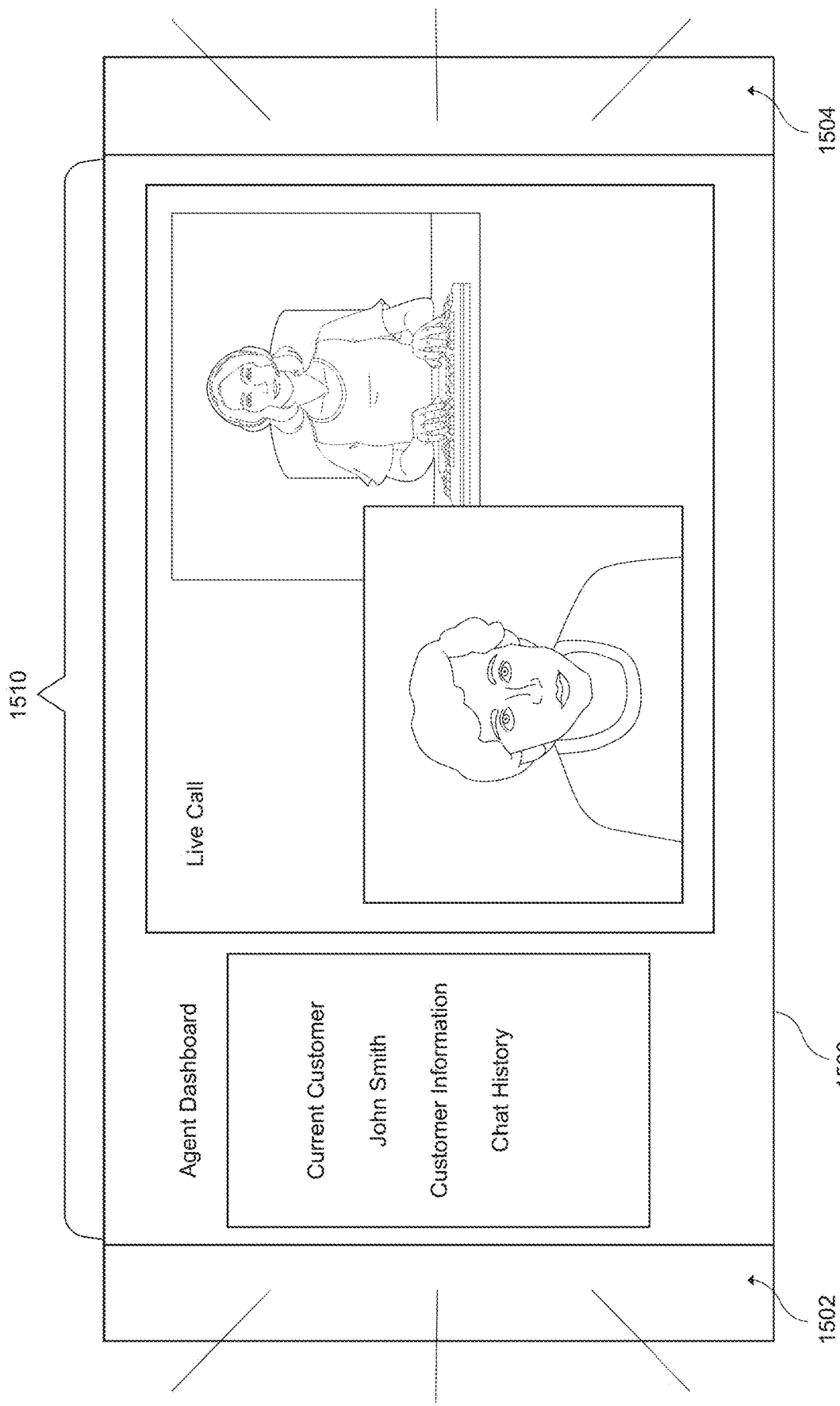
FIG. 15 is a schematic view of a display screen including two illuminating regions, according to an embodiment.
Figure 16:
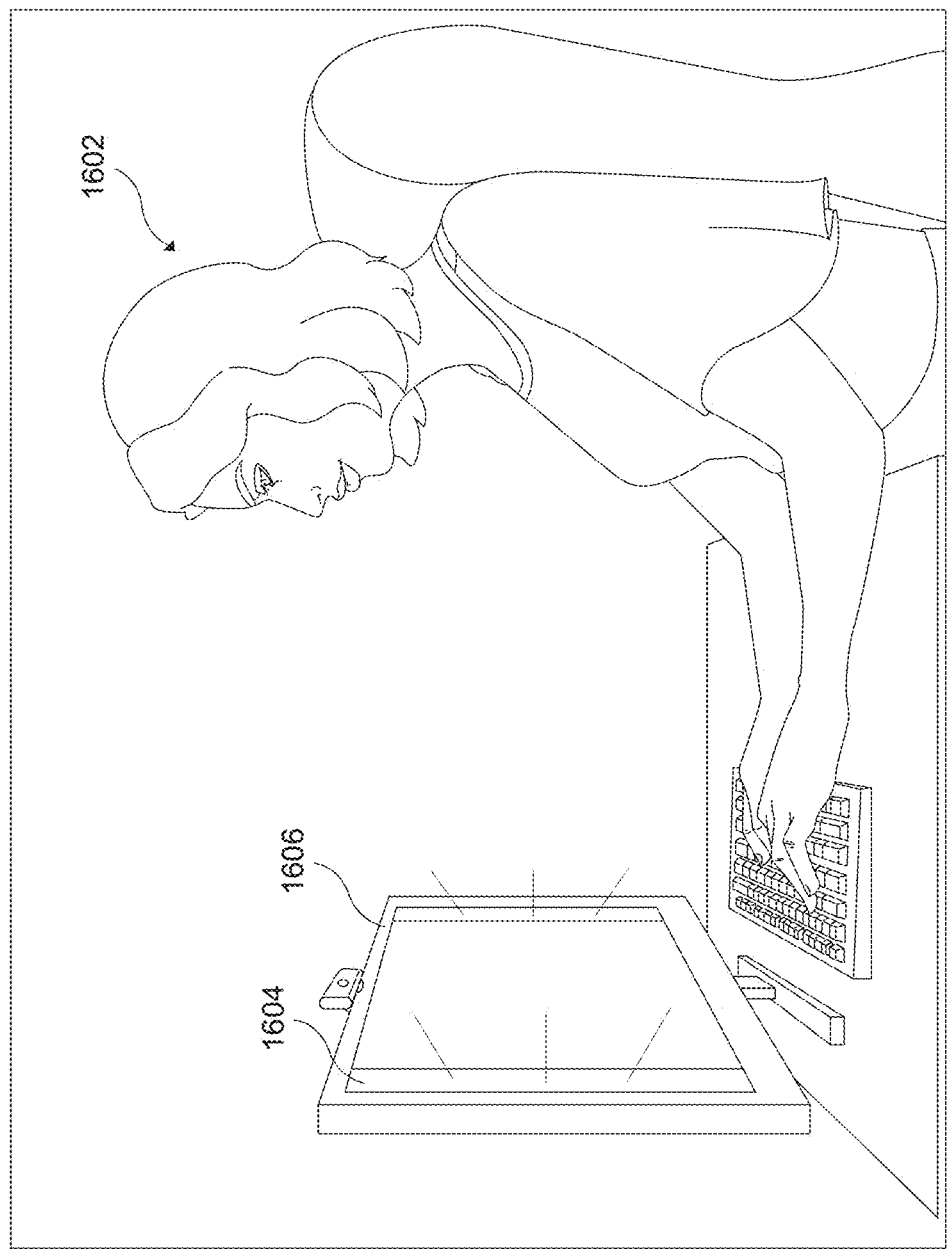
FIG. 16 is a schematic view of a configuration in which a user has a display screen with two illuminated regions, according to an embodiment.

FIG. 15 is a schematic view of a display screen 1500, in which the screen includes two illuminated regions, according to an embodiment. Specifically, display screen 1500 includes a first illuminated region 1502 and a second illuminated region 1504. Each of the illuminated regions comprises a region of the display screen (that is, a region of pixels) that can be adjusted to change the way a user's face is illuminated. Specifically, a user 1602 facing the display screen may be illuminated by the illuminated regions 1604 of a display screen 1606, as shown schematically in FIG. 16.

It may be appreciated that the entirety of a display screen may provide light that illuminates a user to some extent. However, the term "illumination region" as used herein, refers to a region or portion of a display screen that is controlled for the primary purpose of generating light. By contrast, other regions of the display screen may be used to display information for a user. Thus, it may be appreciated, that with respect to informational content, an illuminated region of a display screen is a region with no informational content for the user.

As shown in FIG. 15, first illuminated region 1502 and second illuminated region 1504 comprise rectangular strips that are disposed on opposing lateral sides of display screen 1500. Moreover, the strips bound a central region 1510, which is used to convey visual information to a user. In other embodiments, each illuminated region could have any suitable shape and size. Moreover, the number of illuminated regions could vary, and may include one, two, three, four, or more illuminated regions. In some cases, the shapes, sizes, and total number of illuminated regions could vary according to the dimensions, resolution, display type (for example, LCD, LED, or OLED), or other suitable features of a display screen.

It should be appreciated that the various methods for modifying the exposure or other image characteristics of a video feed using a lighting device could be applied using illuminated regions of a display screen instead. Moreover, in some cases, a combination of separate lighting devices and illuminated regions of a display screen could be used to adjust the exposure or other image characteristics of a video feed.

In some embodiments, a system can be trained to recognize particular users and apply user-preferred camera, lighting, or image processing settings. In such an embodiment, the process may comprise two phases: a training phase and an deployment phase. In the training phase, each user can interact with the system to train a facial recognition algorithm to identify the user's face. For example, a system could capture multiple images of a user (for example, "John Smith") and train a facial recognition model to recognize the user's face and identify it with his name or other credentials. During the training phase, the user could also interact with the system to select user-preferred (that is, customized) settings. Depending on the configuration of the system, these could include camera settings, lighting settings, and/or image processing settings. Here, image processing settings refer to settings that may be applied after the raw video feed from the camera has been received. By contrast, camera settings and lighting settings are used to control external devices, which may cause direct changes to the raw video feed.

Figure 17:
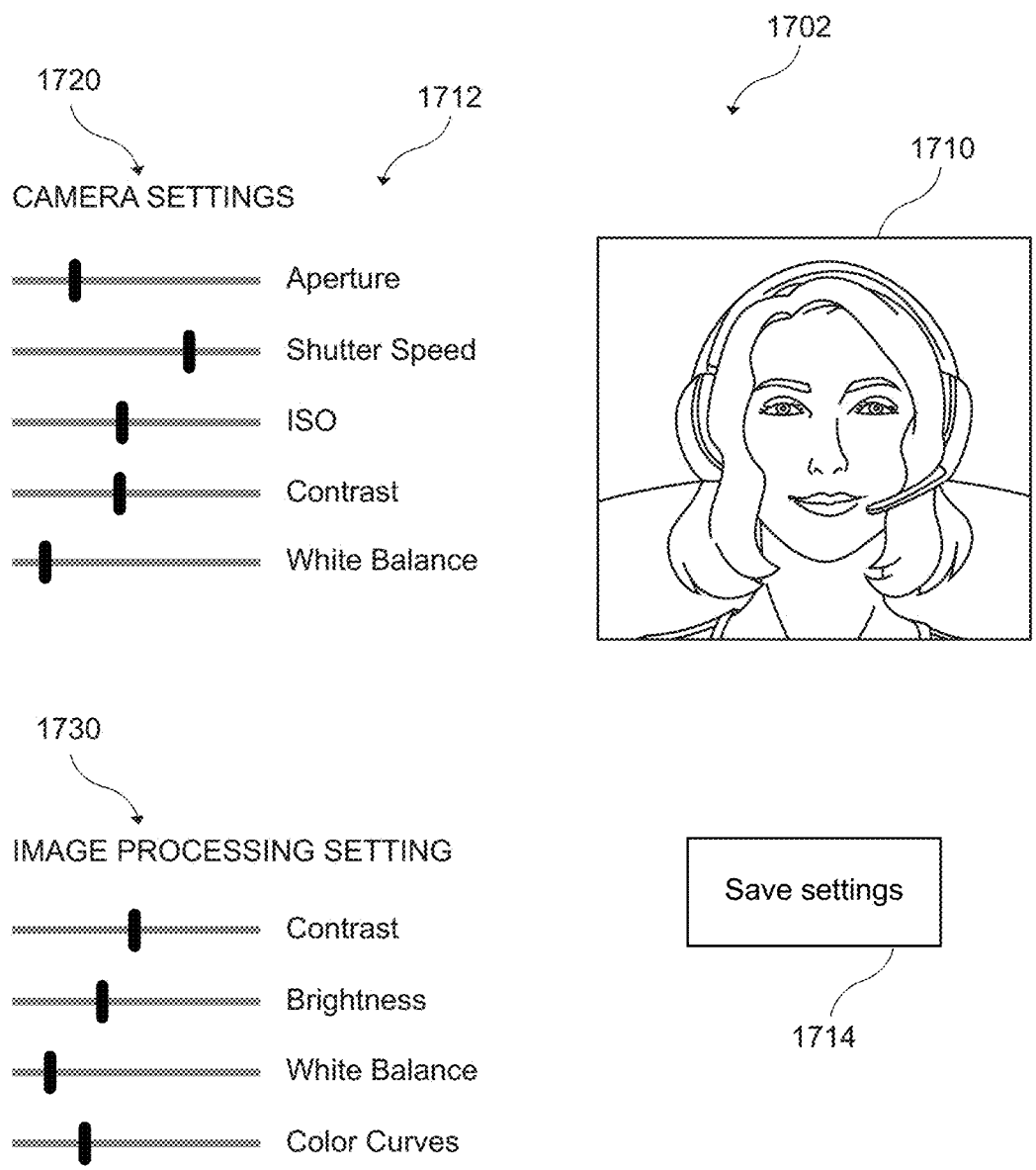
FIGS. 17-19 are schematic views of user interfaces for controlling various device and/or image settings, according to some of the embodiments.
Figure 18:
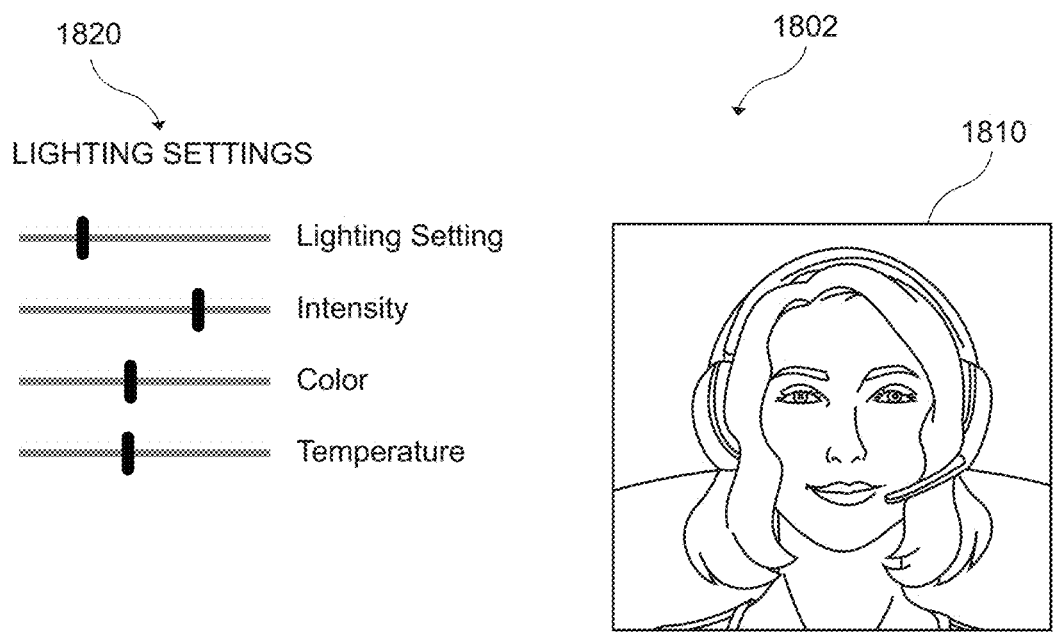
Figure 19:
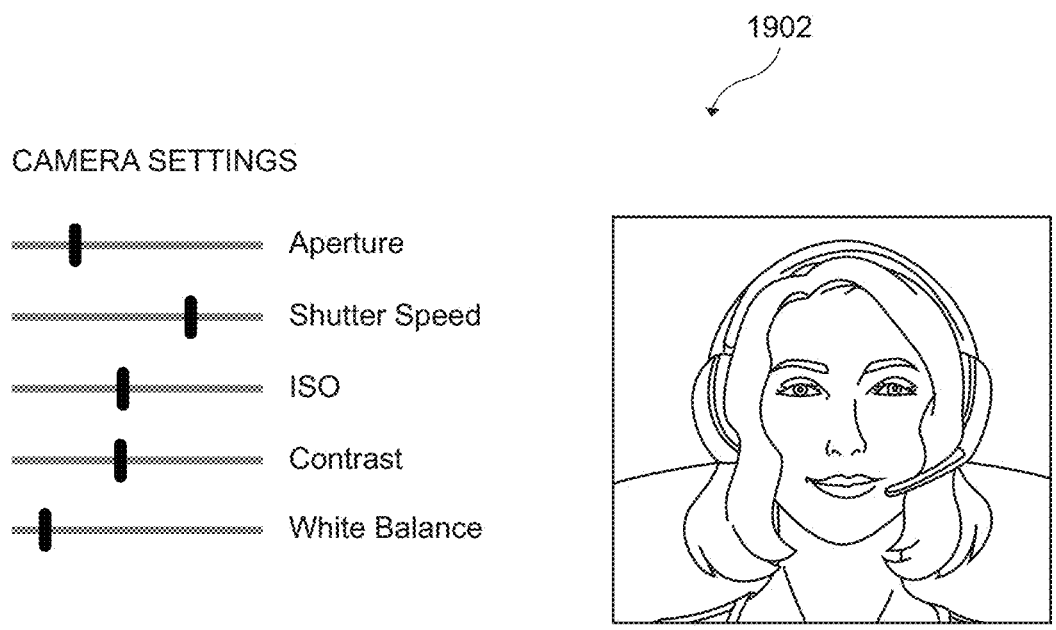
Figure 19:
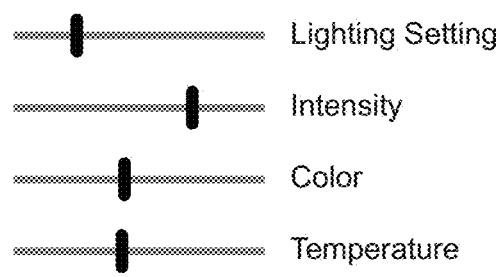

FIGS. 17-19 depict schematic views of different user interfaces that allow a user to try different device (or image processing) settings, and then save those settings as user-preferred settings. Starting with FIG. 17, a user interface 1702 ("UI 1702") comprises a video feed region 1710, a settings region 1712 and a save settings button 1714.

A system may display the current raw video feed, and/or a post-processed video feed within video feed region 1710. The image characteristics of the video feed may be influenced by camera settings 1720 and/or image processing settings 1730. For purposes of illustration, the embodiments depict several possible settings for a camera and/or an image processing subsystem (such as image processing module 258). However, it may be appreciated that any suitable camera settings or image processing settings could be provided through a UI in other embodiments.

Using UI 1702, a user can adjust various settings to create a preferred exposure, or preferred appearance, for their face as shown in video feed region 1710. In some cases, only a previously defined facial region may be shown, since the system may be configured to provide an optimal (or preferred) exposure for the user's face. However, in other embodiments, the entirety of a video feed can be shown and a user can be instructed to focus on the exposure of their face.

In the exemplary embodiment, a user can adjust camera settings corresponding to "aperture," "shutter speed," "ISO," "contrast," and "white balance." However, it may be appreciated that in other embodiments any other suitable camera settings could be adjusted by a user through UI 1702.

In the exemplary embodiment, a user can adjust image processing settings corresponding to "Contrast," "brightness," "white balance," and "color curves." However, it may be appreciated that in other embodiments any other suitable image processing settings could be adjusted by a user through UI 1702.

Once a user has selected a preferred set of camera settings and/or image processing settings, the user can choose to save those settings using save settings button 1714. When this button is clicked, the system may automatically store the current settings as a set of "user-preferred settings". Moreover, these user-preferred settings may be identified with the facial recognition model previously associated with the user, as described above.

In another embodiment, a user interface can provide a user with a way to select user-preferred lighting settings. In FIG. 18, UI 1802 includes similar provisions to UI 1702 of FIG. 17. However, rather than having a user customize camera settings, the user can customize lighting settings 1820. As the user adjusts the lighting settings within UI 1802, the lighting settings of a lighting device and/or illuminated regions of the user's display screen may change, thereby resulting in a modified exposure or other image characteristics in video feed region 1810.

In the exemplary embodiment, a user can adjust lighting settings corresponding to "Lighting direction," "intensity," "color," and "temperature." However, it may be appreciated that in other embodiments any other suitable lighting settings could be adjusted by a user through UI 1802.

FIG. 19 depicts yet another embodiment, in which a user can adjust both camera settings and lighting settings simultaneously using UI 1902. By adjusting both camera settings and lighting settings simultaneously, the system can provide a wider range of possible exposures than might be achievable using only camera settings or lighting settings alone.

Figure 20:
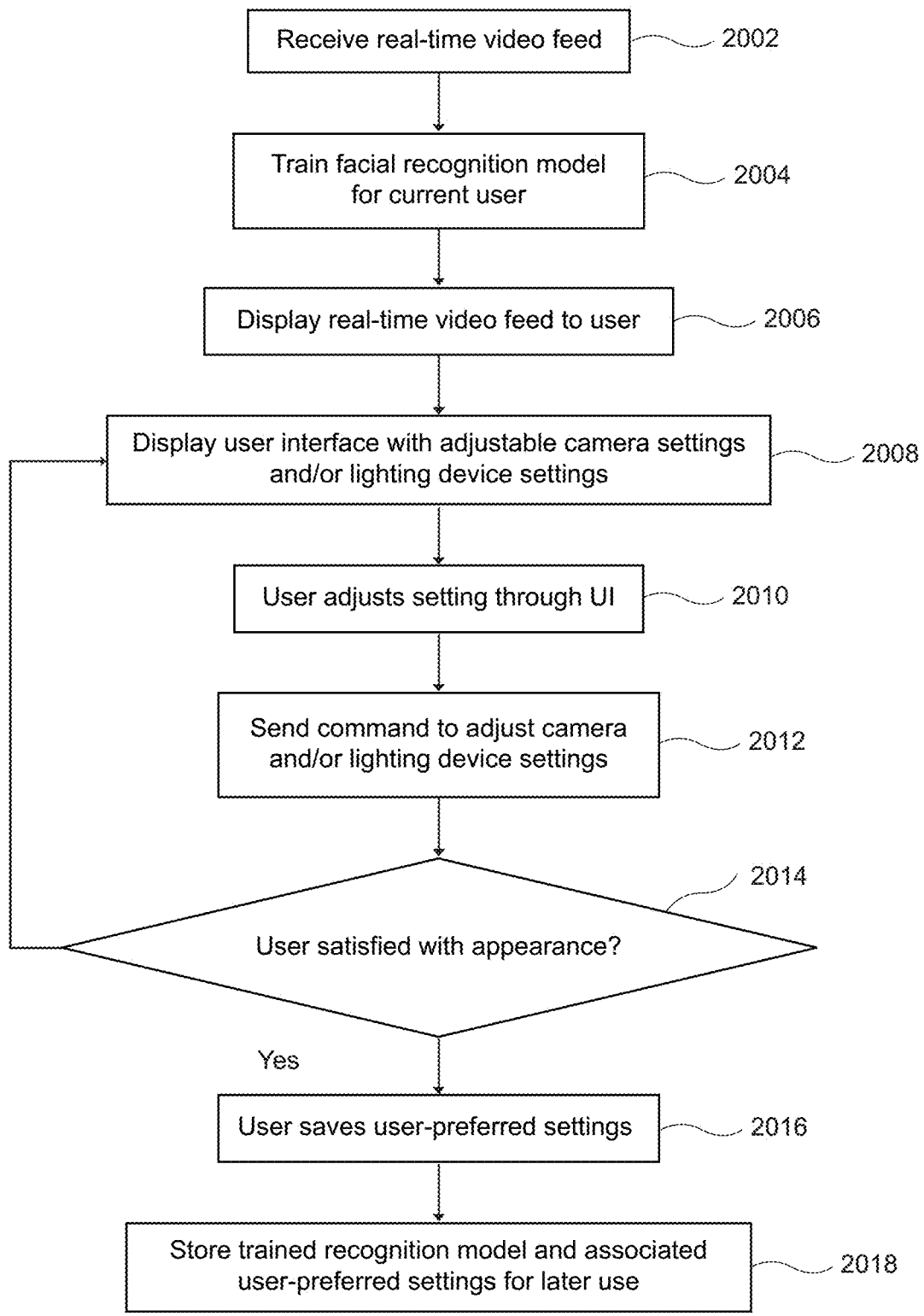
FIGS. 20-21 are schematic views of processes for receiving user-preferred settings and for selecting the user-preferred settings at a later time, according to an embodiment.
Figure 21:
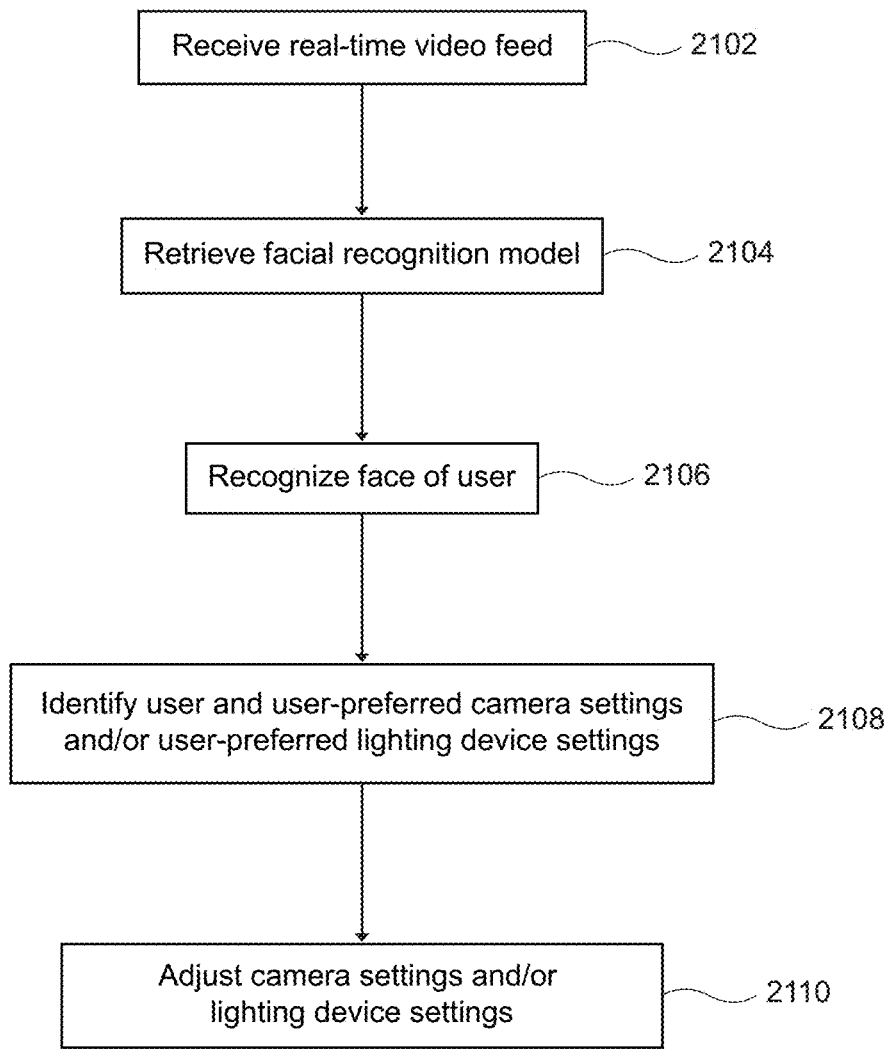

FIGS. 20-21 are schematic processes for a training phase and a deployment phase, respectively, of an exposure optimization system according to an embodiment. FIG. 20 is a schematic view of a process for a system of training a system to recognize a user and to associate user-preferred settings with the user. Starting in step 2002, system 202 can receive a real-time video feed. In step 2004, system 202 can train a facial recognition model for the current user. In some cases, this may include prompting the user to move their head so that a webcam may capture their face from different angles in order to build a robust three-dimensional model of the face. Next, in step 2006, system 202 can display a real-time video feed to the user.

In step 2008, system 202 can display a user interface with adjustable camera settings and/or adjustable light settings, as shown in FIGS. 17-19. In some cases, a UI can also provide adjustable image processing settings.

A user may interact with the UI and adjust the settings in step 2010. In particular, using the real-time video feed that is displayed, the user can observe changes to the exposure or other image characteristics of the video feed in real time as the settings are changed, as in step 2012.

If, in step 2014, the user is satisfied with their appearance as viewed in the real-time video feed, the user may save their user-preferred settings (for example, using button 1714 of FIG. 17) in step 2016. Otherwise, this process may return to step 2008 and continue until the user is satisfied with their appearance at step 2014.

Once the user chooses to save their user-preferred settings, system 202 may proceed to step 2018. In step 2018, system 202 can store a trained facial recognition model and the associated user-preferred settings for later use. In some cases, the trained model and/or user-preferred settings could be stored locally, for example on a user's computer system. In other cases, the trained model and/or user-preferred settings could be stored remotely.

FIG. 21 is a schematic view of a process for automatically recognizing a user and applying the user's preferred settings for a camera, lighting device, and/or image processing to optimize their exposure on the video feed.

In step 2102, system 202 receives a real-time video feed. In step 2104, system 202 retrieves a facial recognition model that can be used to recognize faces from images and/or videos. In step 2106, system 202 may recognize a user's face. Following this, in step 2108, system 202 can identify the user (that is, associated the recognized face with some other identifying information) and retrieve the user-preferred camera settings and/or user-preferred lighting device settings. Alternatively, in some cases, the system could retrieve user-preferred image processing settings.

Finally, in step 2110, system 202 can adjust camera settings, lighting device settings, and/or image processing settings based on the user-preferred settings retrieved in step 2108.

Figure 22:
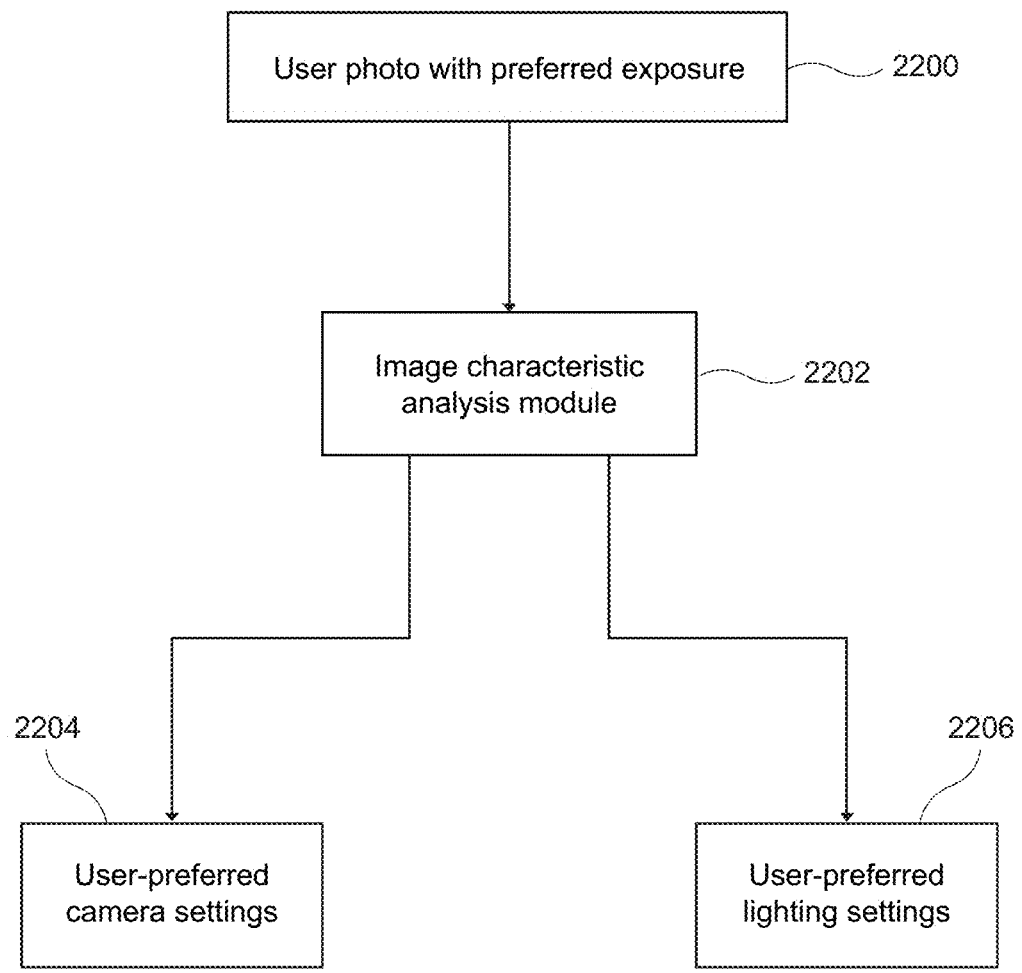
FIG. 22 is a schematic view of an image characteristic analysis module, including inputs and outputs, according to an embodiment.

FIG. 22 depicts an alternative embodiment, in which rather than having a user select particular device settings to achieve an optimal exposure, the user can provide a reference image that is optimally exposed for their face. The reference image 2200 can be analyzed by an image characteristic analysis module 2202. Based on this analysis, the system can automatically generate user-preferred camera settings 2204 and/or user preferred lighting settings 2206.

Figure 23:
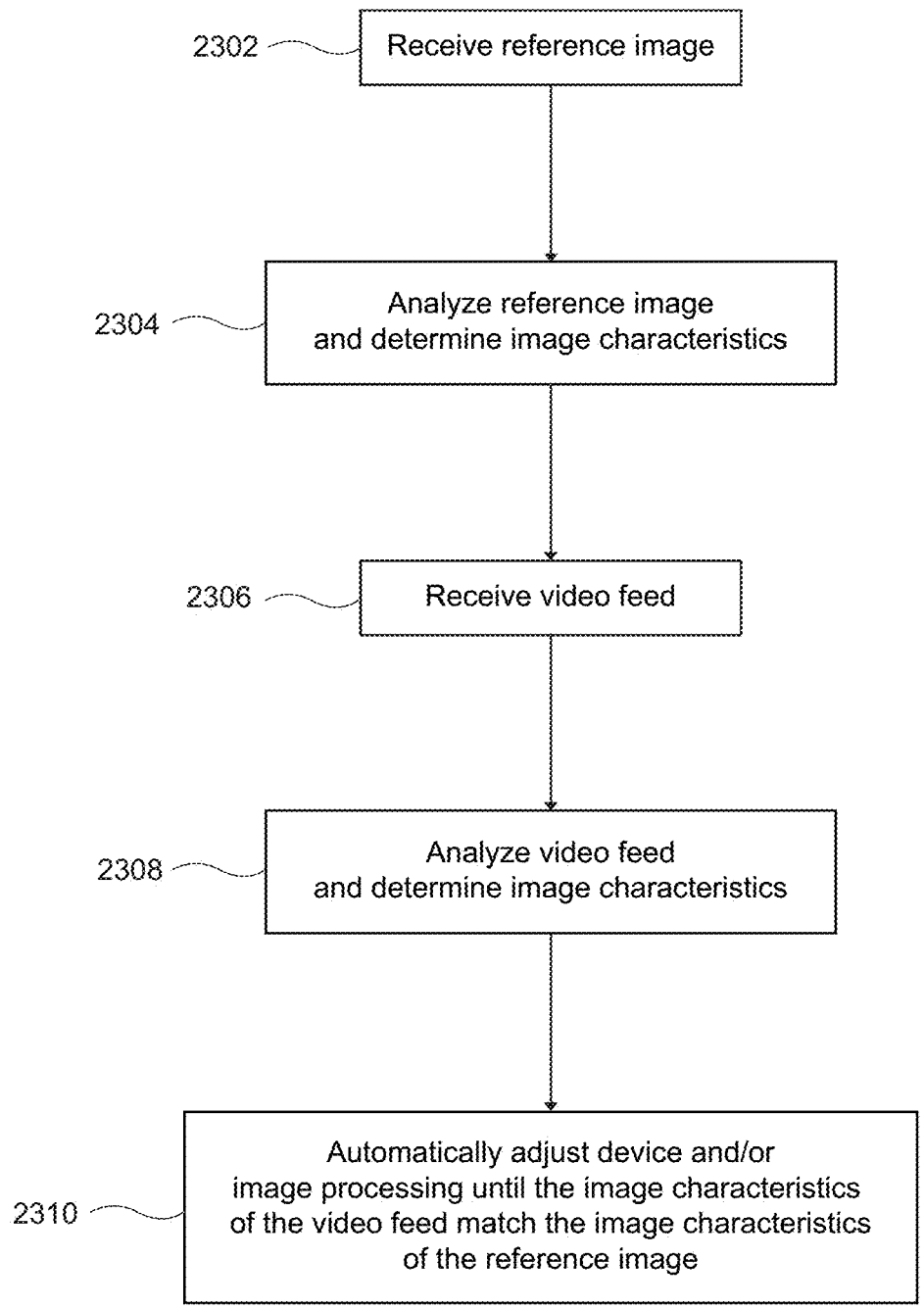
FIG. 23 is a schematic view of a process for automatically optimizing image characteristics of a video feed based on information from a reference image.

FIG. 23 is an exemplary process for generating user-preferred device settings (camera and/or lighting) to match exposure conditions of a reference image. Starting in step 2302, system 202 may receive a reference image (or video) from a user. This could include a professionally taken photograph, for example. In step 2304, system 202 can analyze the reference image and determine image characteristics associated with the image. Next, in step 2306, system 202 can receive a video feed, which may include images of the user. In step 2308, system 202 may analyze the video feed and determine image characteristics for the video feed. In step 2310, system 202 can automatically adjust device settings (for example, a camera and/or lighting device) and/or image processing settings until the image characteristics of the video feed match the image characteristics of the reference image. In some cases, the image characteristics of a video feed may match those of a reference image when the values of the image characteristics are within a predetermined tolerance.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of optimizing image quality for a real-time video feed by automatically performing image processing on the video feed while also automatically adjusting a lighting device and a camera connected to a computer system, the method comprising:
    receiving a video feed from a camera at the computer system;
    automatically detecting a face within the video feed;
    defining a facial region of the video feed including the face;
    analyzing the facial region to determine an image characteristic;
    establishing communication with a lighting device controller, the lighting device controller controlling the lighting device, the lighting device controller initially having a lighting setting with a first value;
    sending a command to the lighting device controller, based on the determined value for the image characteristic, to adjust the lighting setting to a second value that is different from the first value;
    establishing communication with a camera controller, the camera control controlling the camera, the camera controller initially having a camera setting with a first value;
    sending a command to the camera controller, based on the determined value for the image characteristic, to adjust the camera setting to a second value that is different from the first value;
    wherein the camera setting is one or more of aperture, shutter speed, ISO, white balance, color space, and contrast;
    receiving raw video data from the camera;
    processing the raw video data in real time with an image processing module, the image processing module being configured to adjust at least one of contrast, brightness, white balance, and color curves in order to create modified video data; and
    outputting the modified real time video to a video application;
    wherein a user submits a reference image that includes the user's face to an image characteristic analysis module, the image characteristic analysis module analyzes the reference image, and the image characteristic analysis module causes each of the adjustment to the lighting setting, the adjustment to the camera setting, and the image processing module creating modified video data to automatically adjust such that the image characteristic of the video feed matches an image characteristic of the reference image.

2. The method according to claim 1, wherein the method further comprises:
    analyzing the facial region to determine a second value for the image characteristic; and
    sending a second command to the lighting device controller, based on the determined second value for the image characteristic, to adjust the lighting setting to a third value that is different from the first value and from the second value.

3. The method according to claim 1, wherein the method further includes:
    retrieving an optimal range for the image characteristic; and
    sending the command to the lighting device controller when the first value of the image characteristic is outside of the optimal range for the image characteristic.

4. The method according to claim 1, wherein the image characteristic is selected from the group consisting of exposure, contrast, and white balance.

5. The method according to claim 1, wherein
    the image characteristic of the video feed is considered to match the image characteristic of the reference image when the values of the two image characteristics are within a predetermined tolerance.

6. The method according to claim 1, wherein the step of automatically detecting a face within the video feed includes automatically adjusting one or more of the color and direction of the lighting until a face is detected in the video feed.

7. The method according to claim 1, wherein the lighting setting is intensity.

8. The method according to claim 1, wherein the lighting setting is direction.

9. The method according to claim 1, wherein the lighting setting is color.

10. A method of improving appearances of faces within a real-time video feed by automatically performing image processing on the video feed while also automatically controlling a region of a digital display screen of a computer system through a display controller and automatically adjusting a camera connected to the computer system, the method comprising:

receiving a video feed from a camera at the computer system;
automatically detecting a face within the video feed;
defining a facial region of the video feed including the face;
establishing communication with the display controller, the display controller controlling the digital display screen of the computer system;
creating, via communication with the display controller, an illumination region on the digital display screen; and
automatically adjusting, by sending commands to the display controller, a lighting setting associated with the illumination region;
establishing communication with a camera controller, the camera control controlling the camera;
automatically adjusting, by sending a command to the camera controller, a camera setting;
wherein the camera setting is one or more of aperture, shutter speed, ISO, white balance, color space, and contrast;
receiving raw video data from the camera;
processing the raw video data in real time with an image processing module, the image processing module being configured to adjust at least one of contrast, brightness, white balance, and color curves in order to create modified video data;
outputting the modified real time video to a video application; and
wherein a user submits a reference video that includes the user's face to an image characteristic analysis module, the image characteristic analysis module analyzes the reference video, and the image characteristic analysis module causes each of the adjustment to the lighting setting, the adjustment to the camera setting, and the image processing module creating modified video data to automatically adjust such that the image characteristic of the video feed matches an image characteristic of the reference video.

11. The method according to claim 10, wherein the one or more image characteristics comprises at least one of exposure and contrast.

12. The method according to claim 10, wherein the step of automatically detecting a face within the video feed includes automatically adjusting one or more of the color and direction of the lighting until a face is detected in the video feed.

13. The method according to claim 10, wherein the one or more image characteristics comprises white balance.

14. The method according to claim 10, wherein the lighting setting is intensity.

15. The method according to claim 10, wherein the lighting setting is direction.

16. The method according to claim 10, wherein the lighting setting is color.

17. A system for optimizing image quality for a real-time video feed by automatically performing image processing on the video feed while also automatically adjusting a lighting setting of a lighting device and a camera setting of a camera, the system comprising:

a computer system configured to receive a video feed from a camera, the computer system further comprising:
a processor;
memory comprising a non-transitory computer readable media, the memory storing instructions that may be executed by the processor;
an image optimization application stored in the memory;
a lighting device controller providing an interface between the image optimization application and the lighting device, the lighting device controller being configured to adjust the lighting setting of the lighting device;
a camera controller providing an interface between the image optimization application and a camera, the camera controller being configured to adjust a camera setting of the camera;
wherein the image optimization application is configured to detect a face within a video feed received from the camera, and wherein the image optimization application is configured to define a facial region surrounding the detected face within the video feed;
wherein the image optimization application is configured to analyze the facial region and determine an image characteristic corresponding to the facial region; and
wherein the image optimization application is configured to communicate with the lighting device controller and adjust, via commands sent to the lighting device controller, the lighting setting based on at least the determined image characteristic;
wherein the image optimization application is configured to communicate with the camera controller and adjust, via commands sent to the camera controller, the camera setting based on at least the determined image characteristic;
wherein the image optimization application is further configured to receive raw video data from the camera;
process the raw video data in real time to adjust at least one of contrast, brightness, white balance, and color curves in order to create modified video data; and
output the modified real time video to a video application; and
wherein a user submits a reference image that includes the user's face to an image characteristic analysis module, the image characteristic analysis module analyzes the reference image, and the image characteristic analysis module causes the adjustment to the lighting setting, and the adjustment to the camera setting, such that the image characteristic of the video feed matches an image characteristic of the reference image.

18. The system according to claim 17, wherein the image characteristic is exposure.

19. The system according to claim 17, wherein the image characteristic is contrast.

20. The system according to claim 17, wherein the image characteristic is white balance.

* * * * *